United States Patent
Kim et al.

(10) Patent No.: US 11,290,518 B2
(45) Date of Patent: Mar. 29, 2022

(54) WIRELESS CONTROL OF REMOTE DEVICES THROUGH INTENTION CODES OVER A WIRELESS CONNECTION

(71) Applicant: QUALCOMM Incorporated, San Diego, CA (US)

(72) Inventors: Lae-Hoon Kim, San Diego, CA (US); Erik Visser, San Diego, CA (US); Yinyi Guo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 99 days.

(21) Appl. No.: 15/717,027

(22) Filed: Sep. 27, 2017

(65) Prior Publication Data

US 2019/0098070 A1    Mar. 28, 2019

(51) Int. Cl.
| | |
|---|---|
| H04L 29/08 | (2006.01) |
| G10L 15/00 | (2013.01) |
| G06F 3/01 | (2006.01) |
| H04L 67/025 | (2022.01) |
| G10L 15/22 | (2006.01) |
| G02B 27/01 | (2006.01) |
| H04W 4/02 | (2018.01) |
| H04W 4/40 | (2018.01) |

(52) U.S. Cl.
CPC .......... *H04L 67/025* (2013.01); *G02B 27/017* (2013.01); *G06F 3/013* (2013.01); *G06F 3/017* (2013.01); *G10L 15/005* (2013.01); *G10L 15/22* (2013.01); *G02B 2027/0178* (2013.01); *G10L 2015/223* (2013.01); *H04W 4/02* (2013.01); *H04W 4/40* (2018.02)

(58) Field of Classification Search
CPC ..... H04L 67/025; G06F 3/013; G10L 15/005; G02B 2027/0178
See application file for complete search history.

(56) References Cited

U.S. PATENT DOCUMENTS

| | | | |
|---|---|---|---|
| 7,363,398 B2 * | 4/2008 | Scott ...................... | G06F 3/038 340/5.5 |
| 8,253,774 B2 * | 8/2012 | Huitema ................ | H04N 7/147 348/14.08 |
| 8,292,433 B2 * | 10/2012 | Vertegaal ................ | H04N 7/18 351/209 |

(Continued)

*Primary Examiner* — Huy D Vu
*Assistant Examiner* — Bailor C. Hsu
(74) *Attorney, Agent, or Firm* — Espartaco Diaz Hidalgo

(57) ABSTRACT

Various embodiments provide systems and methods which disclose a command device which can be used to establish a wireless connection, through one or more wireless channels, between the command device and a remote device. An intention code may be generated, prior to, or after, the establishment of the wireless connection, and the remote device may be selected based on the intention code. The command device may initiate a wireless transfer, through one or more wireless channels of the established wireless connection, of an intention code, and receive acknowledgement that the intention code was successfully transferred to the remote device. The command device may then control the remote device, based on the intention code sent to the remote device, through the one or more wireless channels of the established wireless connection between the command device and the remote device.

33 Claims, 10 Drawing Sheets

(56) References Cited

U.S. PATENT DOCUMENTS

| | | | | |
|---|---|---|---|---|
| 8,676,904 B2* | 3/2014 | Lindahl | G10L 15/30 | 709/206 |
| 8,928,756 B2* | 1/2015 | Wengrovitz | H04N 7/181 | 348/159 |
| 9,626,561 B2* | 4/2017 | Cho | G06F 3/038 | |
| 9,727,790 B1* | 8/2017 | Vaziri | G06K 9/00771 | |
| 9,823,742 B2* | 11/2017 | Parker | G06F 3/013 | |
| 10,057,421 B1* | 8/2018 | Chiu | H04M 3/4936 | |
| 2008/0249376 A1* | 10/2008 | Zaleski | G06Q 50/22 | 600/301 |
| 2011/0234840 A1* | 9/2011 | Klefenz | G06K 9/4633 | 348/222.1 |
| 2013/0010207 A1* | 1/2013 | Valik | G06F 3/017 | 348/734 |
| 2014/0329511 A1* | 11/2014 | Vesa | H04M 3/569 | 455/416 |
| 2015/0002394 A1* | 1/2015 | Cho | G02B 27/0093 | 345/156 |
| 2015/0006278 A1* | 1/2015 | Di Censo | G06K 9/00845 | 705/14.43 |
| 2015/0061969 A1* | 3/2015 | Chi | G06F 3/013 | 345/2.3 |
| 2015/0181632 A1* | 6/2015 | Ur | G06F 3/012 | 455/39 |
| 2015/0261293 A1* | 9/2015 | Wilairat | G08C 17/02 | 345/156 |
| 2015/0338926 A1* | 11/2015 | Park | G06F 3/011 | 345/156 |
| 2015/0346701 A1* | 12/2015 | Gordon | G05B 15/02 | 700/275 |
| 2016/0014322 A1* | 1/2016 | Kimura | H04N 7/185 | 348/211.2 |
| 2016/0025971 A1* | 1/2016 | Crow | G02B 27/0093 | 345/156 |
| 2016/0274762 A1* | 9/2016 | Lopez | G06T 19/006 | |
| 2016/0328021 A1* | 11/2016 | Lee | G06F 3/011 | |
| 2016/0335981 A1* | 11/2016 | Koo | G06F 3/147 | |
| 2017/0111418 A1* | 4/2017 | Warren | H04N 21/4758 | |
| 2017/0318210 A1* | 11/2017 | Harada | G03B 17/56 | |
| 2017/0337352 A1* | 11/2017 | Williams | G06F 21/10 | |
| 2018/0054506 A1* | 2/2018 | Hart | H04M 1/271 | |
| 2018/0077345 A1* | 3/2018 | Yee | G06K 9/00771 | |
| 2018/0176457 A1* | 6/2018 | Koskan | H04N 7/188 | |

* cited by examiner

WIRELESS CONTROL OF REMOTE DEVICES THROUGH INTENTION CODES OVER A WIRELESS CONNECTION

FIELD

The present is generally related to human interface devices.

BACKGROUND

Mobile and wireless technologies have seen explosive growth over the past several years. This growth has been fueled by better communications, hardware, and more reliable protocols. Wireless service providers are now able to offer their customers an ever-expanding array of features and services, and provide users with unprecedented levels of access to information, resources, and communications. To keep pace with these enhancements, mobile electronic devices (e.g., cellular phones, watches, headphones, remote controls, etc.) have become smaller, more powerful and more feature-rich than ever. Many of these devices now have impressive processing capabilities, large memories, and radios/circuitry for wirelessly sending and receiving information.

Wireless technologies have also improved over the past several years. Wireless local area networks ("WLANs") are now replacing wired networks in many homes and offices. Wireless technologies, such as Bluetooth® ("Bluetooth") and Wireless Fidelity "Wi-Fi" or variants of Wi-Fi (e.g. Wi-Fi Direct), enable high speed communications between mobile electronic devices (e.g., cellular phones, watches, headphones, remote controls, etc.) that are within relatively short distances of one another (e.g., 100 to 200 meters or less depending on the specific wireless technology).

Wi-Fi is often used to connect and exchange information between a device with an access point, (e.g. a router) and devices that are Wi-Fi enabled. Examples of such devices are smart televisions, laptops, thermostats, Amazon echo, Google Home, wireless speakers and other similar devices. Similarly, Bluetooth is also used to connect devices together. Example of such are mobile phones, computers, digital cameras, wireless headsets, keyboards, mice or other input peripherals, and similar devices. Devices (e.g. those previously mentioned) may have both Bluetooth and Wi-Fi capabilities, or other wireless means to communicate with each other. The number of inter-networked devices that have wireless means to communicate with each other ("connected devices"), and their wireless connections is anticipated to continue to increase. In addition, connected devices may also be connected based on different cellular communication systems, such as, a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1×, Evolution-Data Optimized (EVDO), Time Division Synchronous CDMA (TD-SCDMA), or some other version of CDMA.

In recent years, wireless communication technologies, such as Bluetooth or Wi-Fi, have enabled the control of multiple devices connected to an intermediary device, i.e., a hub device (e.g. the Amazon Echo Speaker). Control and interaction is facilitated through automatic speech recognition ("ASR") technology. For example, a hub device may be connected to different "target devices," such as, lightbulbs, outlets, alarm systems, thermostats, garage doors, televisions, a car, or an appliance. ASR allows a keyword or phrase, e.g. "Alexa", to alert the hub device that a voice command is coming to control the devices connected to the hub device. It is also possible for these target devices without a hub device to receive a voice command directly. For example, a Samsung Smart TV, i.e., a television, has ASR technology that allows the channel and volume to be controlled through a "channel up" command.

As connected devices continue to incorporate ASR technology, control using voice commands may pose new challenges and opportunities.

SUMMARY

The various embodiments include methods for enabling a command device that includes one or more processors to establish a wireless connection, through one or more wireless channels, between the command device and a remote device, generate an intention code, select a remote device based on the intention code, initiate a wireless transfer, through one or more wireless channels of the established wireless connection, of an intention code, receive acknowledgement that the intention code was successfully transferred to the remote device, and control the remote device, based on the intention code sent to the remote device, through the one or more wireless channels of the established wireless connection between the command device and the remote device. The command device may also include a gesture detector, coupled to the one or more processors, configured to detect a gesture. The intention code may be based on the detected gesture. In addition, the command device may include a camera, coupled to the one or more processors, including an eye gaze tracker configured to detect eye gaze detection. The intention code may be based on the eye gaze detection. In an embodiment, the command device and the remote device are not in a shared acoustic space. In an alternative embodiment, the command device and the remote device are in a shared acoustic space.

There are various embodiments that includes a method establishing a wireless connection, through one or more wireless channels, between a command device and a remote device, and generating, by a processor, an intention code. The method may also include selecting a remote device based on the intention code and initiating a wireless transfer of an intention code into one of the one or more wireless channels of the established wireless connection. Moreover, the method may include controlling the remote device, based on the intention code sent to the remote device, through the one or more wireless channels of the established wireless connection between the command device and the remote device. In an embodiment, the remote device and the command device are not located in a shared acoustic space. In different embodiment, the remote device and the command device are in a shared acoustic space.

In another embodiment, the command device is coupled to the vehicle, the remote device is not mounted on the vehicle, and the remote device is not in the vehicle.

There are various embodiments that include an apparatus that includes means for establishing a wireless connection, through one or more wireless channels, between the command device and a remote device, and means for generating an intention code. In addition, the apparatus may include means for selecting a remote device based on the intention code, and means for initiating a wireless transfer, through one or more wireless channels of the established wireless connection, of an intention cod. Moreover, the apparatus may include means for receiving acknowledgement that the intention code was successfully transferred to the remote device, and means for controlling the remote device, based on the intention code sent to the remote device, through the one or more wireless channels of the established wireless connection between the command device and the remote device.

There are various embodiments that include a non-transitory computer-readable storage medium having stored thereon instructions that, when executed, cause one or more processors of a command device to establish a wireless connection, through one or more wireless channels, between the command device and a remote device, and generate an intention code. The instructions, when executed, may cause one or more processors of the command device to select a remote device based on the intention code, and initiate a wireless transfer, through one or more wireless channels of the established wireless connection, of an intention code. The instructions, when executed, may additionally cause one or more processors of the command device to receive acknowledgement that the intention code was successfully transferred to the remote device, and control the remote device, based on the intention code sent to the remote device, through the one or more wireless channels of the established wireless connection between the command device and the remote device.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1A:
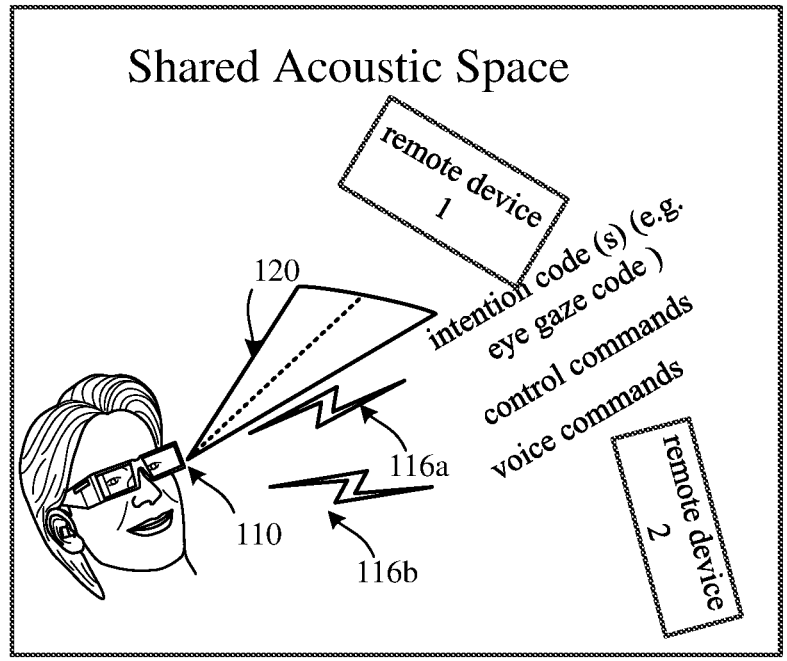
FIG. 1A is an illustration of a command device and a remote device in a shared acoustic space, where the command device exchanges an intention code through a wireless connection.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The term "shared acoustic space" is used generically herein to refer to a bounded space where the distance of a sound source is relatively close to a sound detector, in order for the sound detector to detect the level of the sound emitted by the sound source. The sound detector is coupled to one or more microphones. A bounded space may be an area within a building, house, mall, vehicle, room, or other area in which there are walls, windows, doors, or other barriers to block or attenuate the sound emitted by the sound source as it propagates from the sound source towards the sound detector. It should be also readily recognized that a bounded space may also include a large distance in free space between the sound source and the sound detector, where the sound attenuates through the natural barrier of air as it gets further away from the sound source. For example, a sound made by a person or electronic device that is made 500 meters away from a sound detector typically is not heard unless it is extremely loud (e.g. the sound of a jet or a very loud concert).

Particular implementations of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

As used herein, "integrated" may include "manufactured or sold with". A device may be integrated if a user buys a package that bundles or includes the device as part of the package. In some descriptions, two devices may be coupled, but not necessarily integrated (e.g., different peripheral devices may not be integrated to a command device, but still may be "coupled"). Another example, may be the any of the transceivers or antennas described herein that may be "coupled" to a processor, but not necessarily part of the package that includes a command device. Other examples may be inferred from the context disclosed herein, including this paragraph, when using the term "integrated".

As used herein, "a wireless connection" between devices may be based on various wireless technologies, such as Bluetooth, Wireless-Fidelity (Wi-Fi) or variants of Wi-Fi (e.g. Wi-Fi Direct. Devices may be "wirelessly connected" based on different cellular communication systems, such as, a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1×, Evolution-Data Optimized (EVDO), Time Division Synchronous CDMA (TD-SCDMA), or some other version of CDMA. In addition, when two devices are within line of sight, a "wireless connection" may also be based on other wireless technologies, such as ultrasound, infrared, pulse radio frequency electromagnetic energy, structured light, or directional of arrival techniques used in signal processing (e.g. audio signal processing or radio frequency processing).

The term "in the direction of" is used herein to refer to signify that the device (e.g. a camera has enough information to capture an image of the device or user). "In the direction of does not necessarily mean that literally the device has to be directly in front of another device or user."

As used herein "intention code" may be one or more bits, or a flag that are transmitted over a wireless cannel, for example, in the payload of the wireless channel, that represents the intention of a user, and may be an eye gaze code or gesture code, but may also be associated with another modality, besides eye gaze or gesture.

As used herein A "and/or" B may mean that either "A and B", or "A or B", or both "A and B" and "A or B" are applicable or acceptable.

The term "computing device" is used generically herein to refer to any one or all of servers, personal computers, laptop computers, tablet computers, mobile devices, cellular telephones, smartbooks, ultrabooks, palm-top computers, personal data assistants (PDA's), wireless electronic mail receivers, multimedia Internet-enabled cellular telephones, Global Positioning System (GPS) receivers, wireless gaming controllers, and similar electronic devices which include a programmable processor and circuitry for wirelessly sending and/or receiving information.

The terms "mobile device," "receiver device," "connected device", "wireless device," and "wireless node" are used interchangeably herein to refer to any electronic device that includes circuitry for wirelessly sending and/or receiving information, including any one or all of cellular telephones, personal or mobile multi-media players, watches, wrist displays, medical devices, headsets, headphones, speakers, microphones, computing devices, and other similar electronics.

FIG. 1A is an illustration of a command device and at least one remote device (remote device 1 and remote device 2) in a shared acoustic space, where the command device 110 establishes a wireless connection 116a to exchange an intention code, and selects a remote device (remote device 1) within view 120 of the command device based on the intention code. In FIG. 1A, the command device 110 may include an eye gaze detector 403 (e.g. see FIG. 4) which may generate an eye gaze code. Alternatively or additionally, the command device 110 may include a gesture detector 430 (e.g. see FIG. 4) which may generate a gesture code. An eye gaze code or gesture code are examples of intention code, i.e., an indication that a user associated with the command device 110 is intending to engage in a communication with a remote device wirelessly connected with the command device 110. As shown in FIG. 1A, in an embodiment the command device 110 shares the acoustic space with remote devices, remote device 1 and remote device 2. For illustration purposes, remote device 1 and remote device 2 are shown. The command device 110 may be wirelessly connected 116a to remote device 1, and, also wirelessly connected 116b to remote device 2. The wireless connections (116a, 116b) may each allow for the bi-directional exchange of wireless data over different types of wireless technologies (e.g. Wi-Fi Direct, Bluetooth, Wi-Fi) between the command device 110 and either remote device 1 (via 116a) or remote device 2 (via 116b). Many mobile devices are automatically wirelessly connected. A wireless connection may include a wireless pairing between just two devices, or may include a wireless pairing between one device (e.g. the command device) and many remote devices. In instances within this disclosure, the term wireless pairing and wirelessly connected may be used interchangeably. Some example of wireless pairing between devices are, routers wirelessly paired with laptops, smartphones, or wireless speakers, or smartphones wirelessly paired with wireless headset speakers.

Remote device 1 and remote device 2 may both have automatic speech recognition (ASR) technology integrated as part of these devices, e.g. smart speakers with voice recognition (remote device 1), and a smart TV with voice recognition (remote device 2). In an embodiment, a user wears a command device 110 looks at remote device 1 or makes a hand gesture to point to remote device 1 and says a voice command, e.g. "Play Hotel California". An eye gaze detector 403 (or a gesture detector 420, see FIG. 4) that is coupled to the command device 110 detects the eye gaze (or gesture) of the user. When the eye gaze detector 403 detects that the gaze (or gesture) of the user is looking (or pointing) at remote device 1, the output of the eye gaze detector (or gesture detector) may be used to generate an intention code to wirelessly transfer from the command device to the remote device 1 via a network interface unit 770 (see FIG. 7) that is coupled to the eye gaze detector 403 or gesture detector 420.

Figure 7:
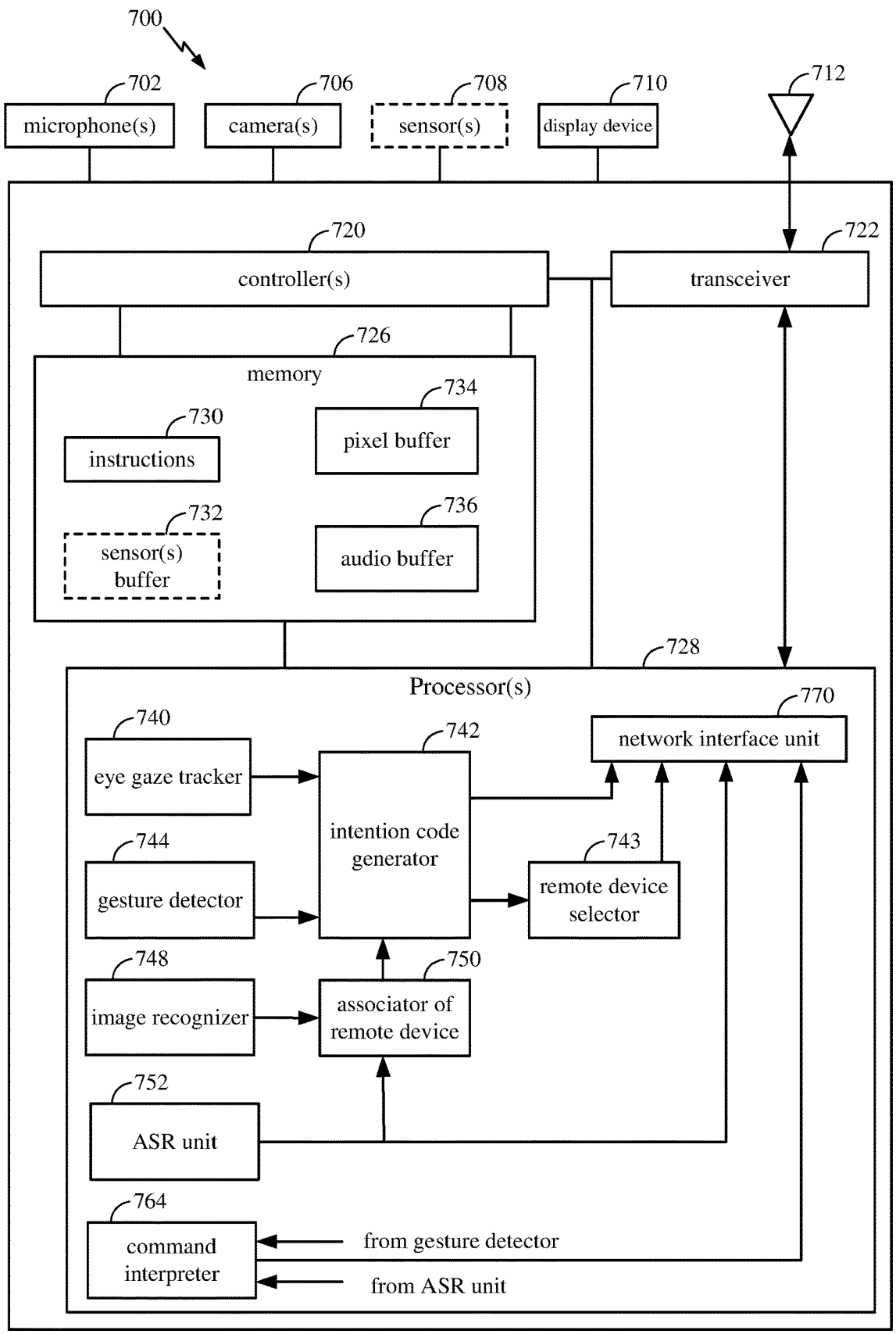
FIG. 7 is a component block diagram illustrating an example of a command device suitable for implementing various embodiments.

The command device 110 may be coupled to one or more microphone(s) 702 (see FIG. 7) (or 615 in FIG. 5B) and send the phrase "Play Hotel California" to an audio buffer 736 (see FIG. 7). One or more processors 728 (see FIG. 7), coupled to the audio buffer 736 may include an ASR unit 752 (see FIG. 7) integrated as part of the command device 110 to determine if the phrase in the audio buffer 736 is interpreted as a voice command. If phrase is a voice command, the command may then be sent over the wireless connection 116a to the remote device 1, and the remote device 1 may perform the appropriate action. For example, the remote device 1 (if the remote device 1 is a smart TV or smart loudspeaker) may play (an appropriate action) the song "Play Hotel California. If the remote device 1 is also performing the role of a digital or virtual assistant, either through the smart TV or smart loudspeaker, or possibly a robot, the appropriate action may be to respond with a query, as an example "by the Eagles?" or "the acoustic version?" or "the one you recorded with your friends?".

A capability that is envisioned based on the disclosure of a number of embodiments described herein, is that the voice commands (e.g. "Play Hotel California") may be sent between the command device 110 and remote device 1 through different wireless technologies after control commands have been initiated based on a generated intention code. One example of an intention code may be generated through eye gaze detection.

Though eye gaze detection or gesture detection has been used with ASR human interface devices within shared acoustic spaces to capture the intention of a user to control an ASR device the previous systems do not disclose an intention code being sent over wireless connection (e.g. 116a) to be used as part of the control mechanism to control the remote device 1. In various embodiments and examples, sending an intention code over a wireless channel allows the remote device 1, to be on "notice" that a voice command or command control command was sent, as the intention code came through the wireless channel. In addition, sending an intention code, like an eye gaze code or gesture codes allows a user to control the remote device 1 through automatic speech recognition using automatic speech recognition technology based on the reception of those eye gaze codes or gesture codes.

In an embodiment, based on the reception of eye gaze codes or gesture codes over a wireless connection 116a, the remote device 1 may be able to turn on or off one or microphone(s) of the remote device 1. In another embodiment, remote device 1 may turn on or off any type of ASR processing blocks it may have associated with the reception of eye gaze codes or gesture codes over a wireless connection 116a.

In additional embodiments, the transmission of eye gaze codes, gesture codes, control commands, and/or voice commands over wireless connections (e.g. 116a, 116b or 116c) using different wireless technologies may be routed from the command device 110 to the remote device 1 through different layers of the OSI 7 model. For example, eye gaze codes, gesture codes, control commands, or voice commands based on phrases captured by one or more microphone(s) may be transmitted over a physical medium (i.e., air for wireless technologies) (layer 1) between different devices that each represent "nodes" of a wireless network. The voice commands may be part of a data link frame (layer 2) protocol which may include frame error sequencing and error checking features. The network layer (layer 3) may map the logical address of each device to the physical address (e.g. an IP address) of each device and decide how to route the physical path the eye gaze codes, control commands, and/or voice command traverse. The transport layer (layer 4) may interpret or convert the eye gaze codes, gesture codes, control commands, and/or voice commands from a previous layer into one or more messages, to use a message-based protocol between the command device 110 and the remote device 1. A session (layer 5) may be established between the command device 110 and the remote device 1 within the session may facilitate the performing of security and name recognition (or association) between devices, and may allow for logging, maintaining and terminating processes between the command device 110 and the remote device 1. The presentation layer (layer 6) represents a translator for the network, and the command device 110 may send syntax messages to the remote device 1, and vice versa, the remote device 1 may send syntax messages to the command device 110. The application layer (7) is the interface for users and application processes that separately run on either the command device 110 or the remote device 1.

The command device 110 may leverage similar functionality of smart glass devices or head mounted display (HUD) devices. For example, eye gaze detectors or eye gaze trackers. Within this disclosure eye gaze detection and eye gaze tracking may be used synonymously unless expressly indicated as otherwise.

Contemplated herein is the ability to leverage some of the functionalities that exist in devices that include eye gaze detection and eye gaze tracking along with ASR technologies for different embodiments disclosed herein describing the command device 110. As such, virtual Reality (VR), augmented Reality (AR), mixed reality (MR), and more recently extended Reality (XR) are different technologies that may be integrated or coupled with ASR technologies described herein, and/or various embodiments described herein.

The eye gaze detection or gesture detection may be combined with ASR technology and represent one embodiment of the command device 110. For example, a user may point at remote device 1 or look at remote device 1 and say "Play Hotel California"

It should be noted that though the descriptions disclosed herein for any of the figures sometimes describe that a remote device 1 is within the view of the command device 110, it is understood that the view of the command device 110 may mean that the user may be wearing a command device 110 that has coupled to it one or more cameras (e.g. see FIG. 5A) detecting the eye gaze of the user, or gesture detectors coupled to the command device 110, and the gaze of the user or gesture of the user may be considered to be "within the view of the command device 110. Similarly, it is also understood that the user may be wearing a command device 110 that has coupled to it that detects the eye gaze of the user through a representation of the remote device 1 (see FIG. 5A) generated by one or more cameras that capture the image of the remote device 1. Also understood, is that the command device 110 does not necessarily have to be worn by the user, but may be in close proximity to the user. For example, the command device may be a laptop that have coupled to it one or more front cameras, one or more rear cameras and a display where representations of the images of remote device 1 may be shown. It is foreseen that devices of the future, e.g. a home or office stationary or mobile personal robot may also include front and/or rear cameras to detect eye gaze or gestures of a user, and may also represent images of the remote device 1 on a display coupled to the robot.

Figure 1B:
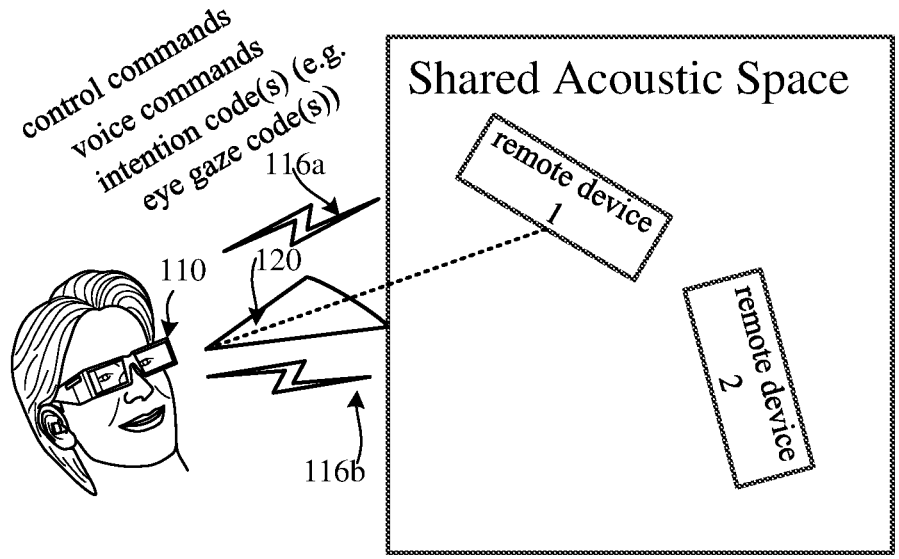
FIG. 1B is an illustration of a command device and a remote device not in a shared acoustic space, where the command device exchanges an intention code through a wireless connection.

FIG. 1B is an illustration of a command device and at least one remote device (remote device 1 and remote device 2) that are not in a shared acoustic space together, where the command device 110 establishes a wireless connection 116a to exchange an intention code, and selects a remote device (remote device 1) within the view 120 of the command device based on the intention code. A person having ordinary skill in the art recognizes that the embodiments disclosed relating to FIG. 1A may be also applicable to the scenario illustrated in FIG. 1B. As illustrated in FIG. 1B, however, is that the command device 110 is outside of the shared acoustic space of the command device 1.

For example, in an embodiment, the remote device 1 may have an automatic speech recognition (ASR) unit 752 (e.g. see FIG. 7) in a processor 728 (see FIG. 7). An ASR unit may automatically process speech recognition using different automatic speech recognition techniques. The ASR unit may be coupled to microphones that are part of the remote device 1, and the distance between the remote device 1 is too many meters away from the command device for the ASR unit to be able to pick-up a phrase with any form of reliability because of the low signal to noise ratio (SNR) of the phrase relative to other sounds picked up by the ASR unit local to the remote device 1 As an example, the remote device 1 may be a robot located outside of a building, and the distance between the robot and the command device is 30 meters. In this example, the "outside robot" may not necessarily be the command device 110, but may be the remote device 1.

A user may have the intent to command the outside robot that is within the view of a command device being worn by a user or that is in close proximity to the user (e.g. a digital assistant integrated into a smart speaker, or laptop, or car or a personal assistant robot) but the robot can't properly "hear" a phrase uttered by the user. For example, the phrase may be "take a picture of the roses and send them to grandma." In such a scenario, similar to what has been described with respect to FIG. 1A, the outside robot may receive an intention code from the command device when a user points or looks at the outside robot.

In a different embodiment where the gesture is not necessarily used to generate the intention code, the gesture may serve as the basis for a control command. For example, after the outside robot receives the intention code based on the user's eye gaze being toward the direction of the outside robot, the user may point to the roses, and the gesture of pointing to the roses may be captured and sent as a control command that precedes the voice command "take a picture of the roses and send them to grandma".

In alternative embodiment, the command device 110 is also a robot. In this example, if the command device 110 is also a robot, the robot may be considered to be "an inside robot", and the user may look at the inside robot to have an intention code generated, then point outside to the roses and utter the phrase "take a picture of the roses and send to grandma". The inside robot may have cameras looking towards the roses and also the same or different cameras may be able to detect the eye gaze of the user and generate an intention code, e.g. an eye gaze code. The same or different cameras (or a separate gesture detector) may be able to detect the pointing gesture of the user pointing towards the roses, and generate a control command including the gesture and location of where pointing to. The inside robot may have coupled to it one or more microphones to capture the uttered phrase by the user. Thus, the inside robot may send the intention code to the outside robot, along with a control command of a gesture to pointing in a general direction of the roses. In an embodiment, the voice command "take a picture of the roses and send to grandma" may be captured by the one more microphones. As a result, the outside robot may take the action of focusing on the roses (being pointed to or that were pointed to by the user), take a picture, and have "grandma's" contact information (e.g. phone number) and send her a text with the picture of roses. The user may follow up with a voice command "tell grandma 'just like the ones you had me take care of as a kid".

It is readily understood that a laptop, smart speaker, or any other similar device that includes the functionality described herein may be deemed a primitive inside robot. The labels "inside robot" and "outside robot" were for illustration purposes, and a robot may be considered both an inside robot and outside robot. In some instances, the robot may only be considered or referred to as either an outside robot or inside robot, e.g. an outside robot may be a lawnmower of the future with computer vision capabilities, and an inside robot may be a more advanced version of a vacuum cleaner with computer vision capabilities.

Figure 1C:
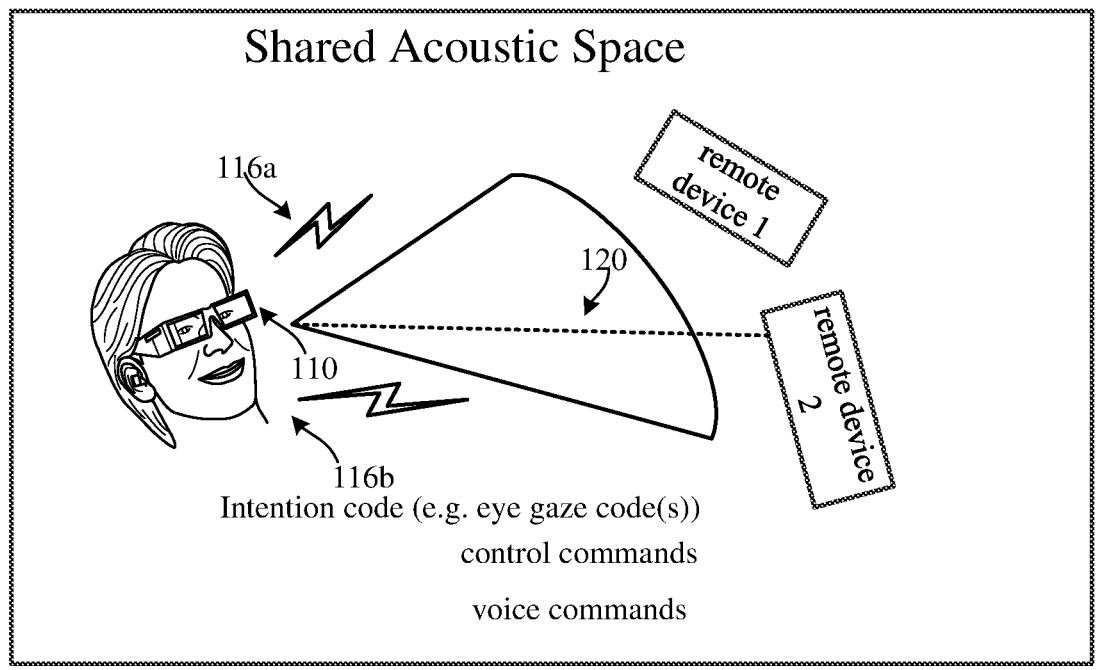
FIG. 1C is an illustration of a command device and two remote devices, within the view of the command device, that are in a shared acoustic space, where the command device exchanges an intention code through a wireless connection.

FIG. 1C is an illustration of a command device 110 and at least one remote device (remote device 1 and remote device 2) in a shared acoustic space, where the command device 110 establishes a wireless connection to exchange an intention code, and selects a remote device (remote device 1) when two different remote devices (remote device 1 and remote device 2) are within view 120 of the command device 110, based on the intention code. A person having ordinary skill in the art would appreciate that the embodiments disclosed relating to FIG. 1A may be also applicable to the scenario illustrated in FIG. 1C. As illustrated in FIG. 1C, however, is that the command device 110 and the remote device 1 are within the same view 120 of the user or a command device 110 and an additional remote device (remote device 2).

Figure 1D:
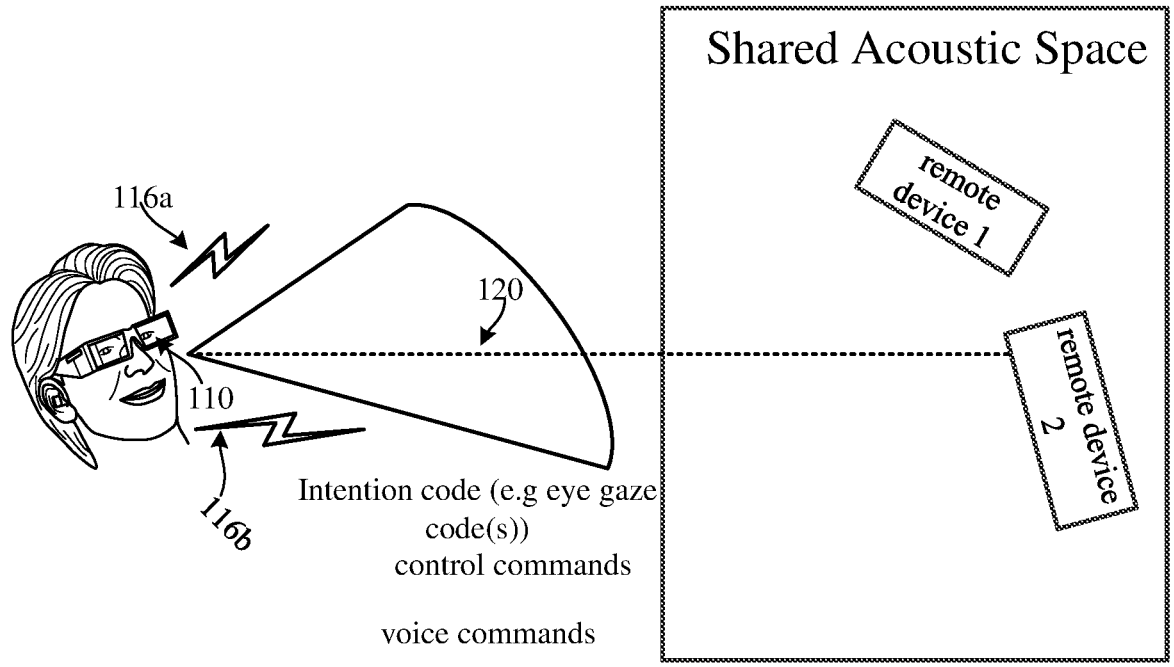
FIG. 1D is an illustration of a command device and two remote devices, within the view of the command device, that are not in a shared acoustic space, where the command device exchanges an intention code through a wireless connection.

FIG. 1D is an illustration of a command device 110 and at least one remote device (remote device 1 and remote device 2) are not in a shared acoustic space together, where the command device 110 establishes a wireless connection to exchange an intention code, and selects a remote device (remote device 1) when two different remote devices (remote device 1 and remote device 2) are within view 120 of the command device 110, based on the intention code. A person having ordinary skill in the art would appreciate that the embodiments disclosed relating to FIG. 1A may be also applicable to the scenario illustrated in FIG. 1D. As illustrated in FIG. 1D, however, is that the command device 110 and the remote device 1 are within the same view 120 of the user or a command device 110 and an additional remote device (remote device 2).

Figure 1E:
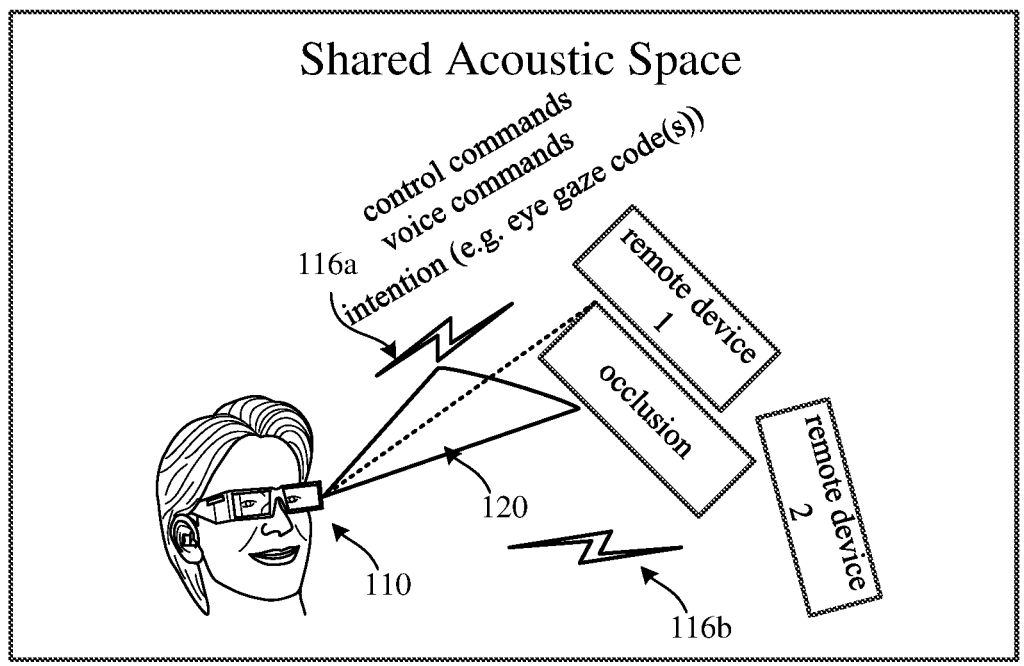
FIG. 1E is an illustration of a command device and a partially occluded remote device in a shared acoustic space, where the command device exchanges an intention code through a wireless connection.

FIG. 1E is an illustration of a command device 110 and at least one remote device (remote device 1 and remote device 2) in a shared acoustic space, where the command device 110 establishes a wireless connection to exchange an intention code, and selects the remote device (remote device 1) when the remote device 1 is partially occluded within view of the command device 110, based on the intention code. A person having ordinary skill in the art would appreciate that the embodiments disclosed relating to FIG. 1A may be also applicable to the scenario illustrated in FIG. 1E. As illustrated in FIG. 1E, there is an occlusion within the view 120 of the command device 110 blocking the remote device 1. Despite the occlusion, the command device 110 may be aware of the location of the remote device 1. For example, through GPS remote device 1 may be aware of its location if the remote device 1 is located outside. If the remote device 1 is inside, and remote device 1 is a robot, for example, through the use of simultaneous localization and mapping (SLAM), which is a mapping and navigation technology for constructing and updating a map of an unknown environment while simultaneously tracking the device's location within it. As such, the remote device 1 may send its location data to the command device 110.

The command device 110 may be able to determine through eye gaze detection or gesture detection that the intent of the user is to engage with the remote device 1 even though there is an occlusion. In addition, if there are cameras coupled to the command device 110 facing the remote device 1, image feature extraction techniques, may be able to match image features from the remote device 1 and match them with a local database associated with the command device 110 so that the remote device 1 may be identified even though there is an occlusion. That is to say, an association of the intention code with the extracted image features of the remote device 1 is possible with or without an object occluding the remote device 1. Examples of feature extraction techniques include, but are not limited to, Scale Invariant Feature Transform (SIFT), Histogram of Gradients (HOG), color segmentation to classify objects, region of interest (ROI) based on pixel comparisons.

Figure 1F:
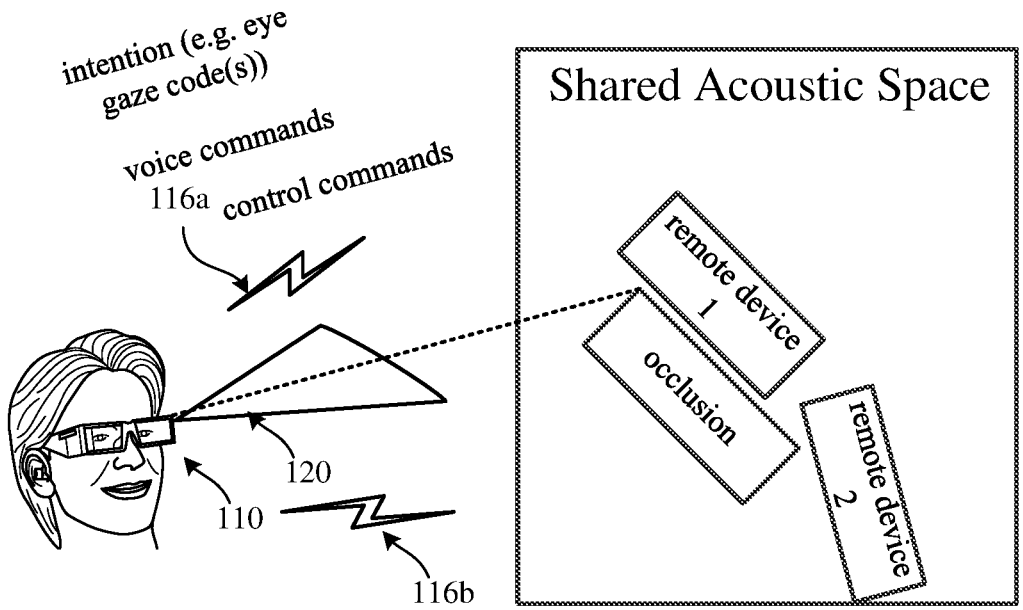
FIG. 1F is an illustration of a command device and a partially occluded remote device not in a shared acoustic space, where the command device exchanges an intention code through a wireless connection.

FIG. 1F is an illustration of a command device 110 and at least one remote device (remote device 1 and remote device 2) are not in a shared acoustic space, where the command device 110 establishes a wireless connection to exchange an intention code, and selects a remote device (remote device 1) when the remote device 1 is partially occluded within view 120 of the command device 110, based on the intention code. A person having ordinary skill in the art would appreciate that one or more embodiments disclosed relating to FIGS. 1A, 1B, 1C, 1D and 1E may be also applicable to the scenario illustrated in FIG. 1F. As illustrated in FIG. 1F, the command device 110 and the remote device 1 are not located in a shared acoustic space.

Figure 2:
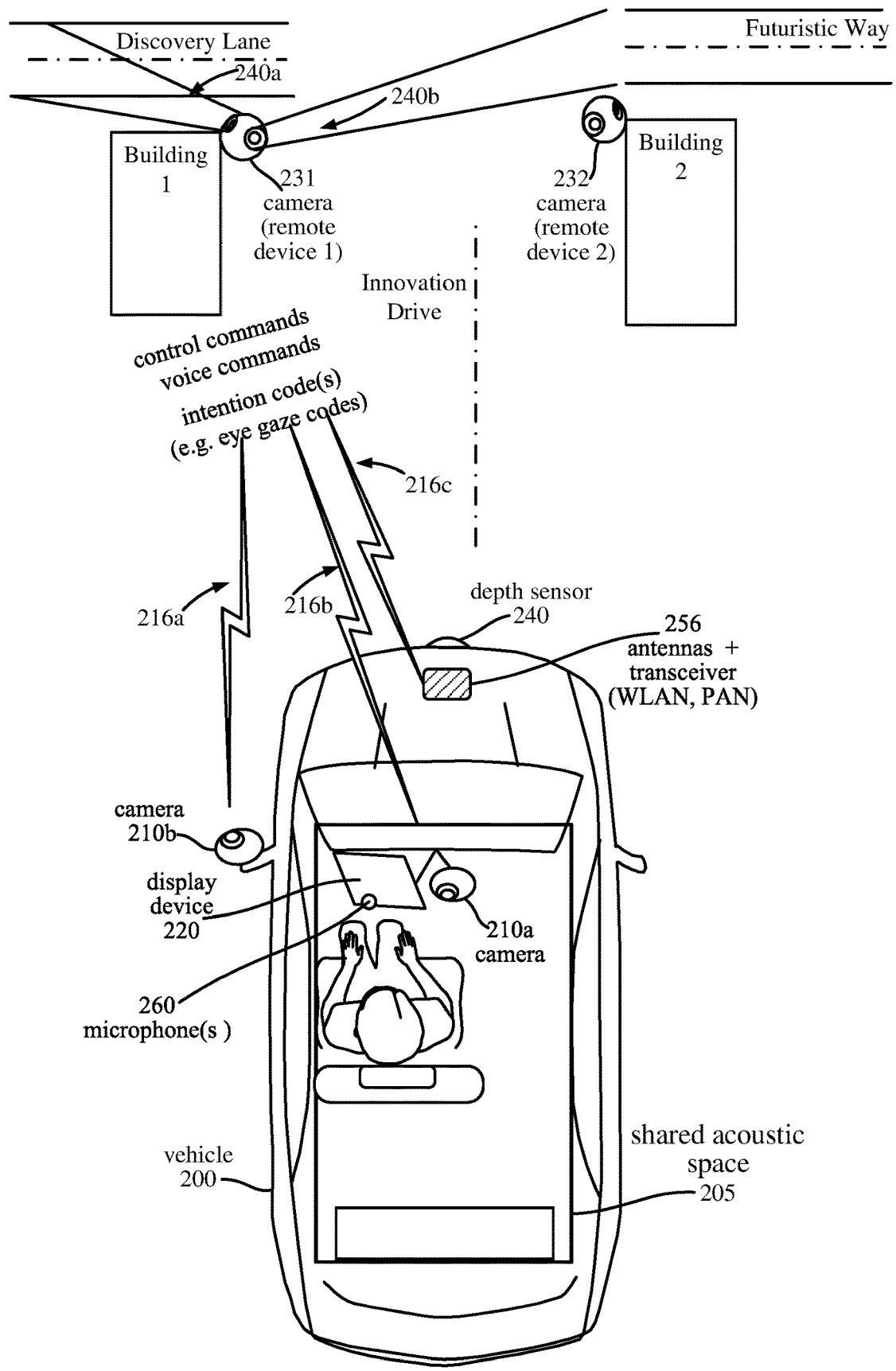
FIG. 2 is an illustration of a command device within a vehicle and a remote device is not in a shared acoustic space.

FIG. 2 is an illustration of a command device 110 and at least one remote device (remote device 1 and remote device 2) are not in a shared acoustic space, where the command device 110 is within a vehicle 200, and the command device 110 establishes a wireless connection (216*a*, 216*b*, or 216*c*) to exchange an intention code. The intention code may be generated by a camera 210*a* mounted in the vehicle 220, or camera 210*b* mounted on the vehicle 200. As illustrated in FIG. 2, a driver may be driving in a vehicle 200 on a street named "Innovation Drive" towards an intersection. At the intersection, the name of the street to the left is "Discovery Lane", and, the name of the street to the right is "Futuristic Way". The driver may want to see what's (e.g. the traffic pattern) on each of the streets, so the driver may either look at camera 231 mounted on or near Building 1, or makes a gesture (e.g. points) towards the camera 231 mounted on or near Building 1, or touches (another form of a gesture) the display device 220 which has an image, icon, or other representation of the camera 231 mounted on or near Building 1. The intention code is generated, by either the eye gaze of the driver or the gesture detection (pointing or touching) of the driver. The camera 231 (or camera 232) is not mounted on or in the vehicle 200, and is also not within the acoustic shared space of the vehicle 200.

A selection of the camera 231, based on the intention code, may be (a) within the view of the driver directly which may be captured by an eye gaze detector or gesture detector coupled to camera 210*a* within the vehicle 200. The camera 210*a* may be coupled or integrated as part of display device 220, and may have an established wireless connection 216*a* with the camera 231 mounted on or near Building 1. The camera 210*b* mounted on the vehicle 200 may also have a wireless connection 216*b* established with the camera 231 mounted on or near the Building 1. Alternatively or additionally, the one or more antennas may transmit the intention code (e.g. an eye gaze code, or gesture code) to the camera 231 mounted on or near the Building 1.

Through either a wireless local area network (WLAN), which could be part of a cellular network or the co-existence of a cellular network and a Wi-Fi network, or solely a Wi-Fi network, the one or more antennas 256, optionally coupled with a depth sensor 240, may aid in the determination the relative location of where the camera 231 mounted on or near the Building 1 is to the vehicle 200. It should be noted that, through one or more antennas 256 the camera 210*a* mounted within the vehicle 200, or the camera 210*b* mounted on the vehicle 200, or both cameras 210*a*, 210*b*, depending on the bandwidth available, may form a personal area network (PAN) that is part of the vehicle 200. Through the PAN it may be possible for either camera 210*a* in the vehicle 200, or a camera 210*b* on the vehicle to be have an indirect wireless connection 216*a*, or 216*b* with the camera 231 mounted on or near the Building 1.

It is also possible that the camera 231 mounted on or near the Building 1, may be viewed by the driver on a display device 220 indirectly. An image of the camera 231 may have been captured by the camera 210*b* mounted on the outside of the vehicle 200, and the image, icon or other representation associated with the camera 231 may be displayed on the display device 220, and selected by the driver based on an intention code. In addition, based on the one or more antennas 256 and possibly a depth sensor 240, or other location detection technology (e.g. GPS) detecting the location of the camera 231, the relative location of the camera 231 on or near the Building 1 may be represented on the display device 220. The representation of the relative location of the camera 231 mounted on or near the Building 1, may appear as a synthetic image, icon or other representation associated with camera 231, such that the driver may make a selection of the camera 231 through an eye gaze towards the representation on the display device 220, or gesture (pointing or touch) towards the representation on the display device 220.

As the camera 231 on or near the Building 1 has received an intention code, the camera 231 may be in a mode to able to receive a request, associated with the vehicle 200, either in the form of a voice command or control command from the driver. Based on either a one or more voice commands and/or one or more control commands, the camera 231 may stream a video of the appropriate view 240*a* or 240*b*, after receiving the request. In turn, the vehicle 200 may receive the video stream. The video stream may be received by the vehicle 200, by a transceiver mounted in or on the vehicle 200, coupled to the one or more antennas 256. As the video stream is received it may be represented on the display device 220. The display device 220 may be coupled to the command device 110. The one or more voice commands or control commands, based on the intention code (an eye gaze code or gesture code) sent to the remote device 1 (e.g. camera 231) may be transmitted through the one or more wireless channels of the established wireless connection between the command device and the remote device.

For example, a request in the form of a voice command may be captured by one or more microphone's 260 which may be included within the cabin of the vehicle 200 and coupled to one of the intention code generation mechanisms (i.e., an eye gaze detector or gesture detector). The driver, may utter the phrase "please show me the street up on the left" or "please show me a video of what's on Discovery Lane", or other phrase to indicate that the driver wants to see a video stream of what's on Discovery Lane through a view 240a of the camera 231 mounted on or near Building 1. The view 240a may capture a series of images (e.g. video) of what's on Discovery Lane (e.g. a traffic pattern) and compress the series of images and stream (could be the bitstream of the series of images) the video of what's visible in the view 240a of the camera 231 directed towards Discover Lane. Phrases may also be uttered to have a video stream of Futuristic Way from the camera 231 mounted on or near the Building 1 to the vehicle 200.

A request in the form of a control command, for example, may be detected by a gesture detector (e.g. either through pointing or touch). In one embodiment, there may be an icon or other representation on the display device 220 within the vehicle (or captured by the in-cabin camera 210a, to indicate that touching it or making a designated gesture may trigger a video stream from the remove device 1 (camera 231), to be sent to the vehicle 200, and be displayed on the display device 220.

In addition, the driver may want to indicate either through a gesture (a control command) or voice command to have the camera 231 swivel or move if there the camera 231 has a servo motor and the camera 231 is in a setting that allows for such control. As such, the remote device 1 (e.g. the camera 231) may be controlled, based on the intention code sent to the remote device 1, through the one or more wireless channels of the established wireless connection between the command device and the remote device 1.

The command device 110 in the vehicle 200 may comprise an intention generation mechanism (e.g. an eye gaze detector or gesture detector), which may be integrated or coupled to the camera 210a in the vehicle 200, or the camera 210b mounted on the vehicle 200. In addition, the command device 110 may include the one or more microphone's 260 within the vehicle 200, to capture voice commands.

In a bi-directional communication system (the command device in wireless connection with a remote device), such as the ones described herein, after the intention code is sent from the requester (i.e., the command device), the requester may directly receive acknowledgement (e.g. an ACK signal) that the intention code was successfully transferred to the remote device 1. There may exist a representation mechanism (e.g. a visual signal or audible signal) associated with the that the ACK signal was sent by the remove device 1. The command device, may also indirectly receive acknowledgement that the intention code was successfully transferred to the remote device 1, by the fact that the request is being fulfilled (e.g. the video of one of the streets is being displayed on the display device 220).

In an embodiment, the camera 210b mounted on the vehicle 200, and coupled to a transceiver and one or more antennas 256, coupled to the vehicle 200, may receive an image of the remote device 1 (e.g. camera 231). The camera 210b, facing in the direction of the remote device 1, may extract image features (through an image recognizer 520) of the remote device 1. The command device 110 in the vehicle 200 may receive, a unique identifier of the remote device 1 (e.g. a MAC address of the camera 231), and associate extracted image features of the remote device 1 with received unique identifier of the remote device 1. Based on the association, an intention code may be generated. Thus, associating the intention code with the extracted image features of the remote device, may allow the remote device 1 to be selected by the driver. The command device 110 in the vehicle 200 may initiate a wireless transfer of the intention code to the remote device 1.

It should be recognized by one of ordinary skill in the art, that the illustrations and many of the descriptions of FIGS. 1B, 1D, and 1F, are applicable to the scenario of FIG. 2 described. For example, there may be an occlusion blocking the camera 231 on or near Building 1. As another example, both cameras 231, 232 may be within the view of the driver, and based on the intention code, the appropriate camera (i.e., camera 231 as described herein) would be selected. Similarly, the camera 231 may be commanded to take a picture of an object within the video stream, e.g. a crowd of people or cars, within view 240a, or view 240b of camera 231 and sent to a particular person via a phone number or url (the address of a world wide web page), as a result of a voice command or control command.

A person having ordinary skill in the art, also would appreciate that as advances in autonomous vehicles continue, the driver of the vehicle 200 may not actually be conducting (i.e., "driving") the vehicle 200 manually. Rather, the vehicle 200 may for some portion of time be self-driving. In such cases, the intent of the driver (i.e. a passenger) in the vehicle 200 may be captured through intention codes.

Figure 3:
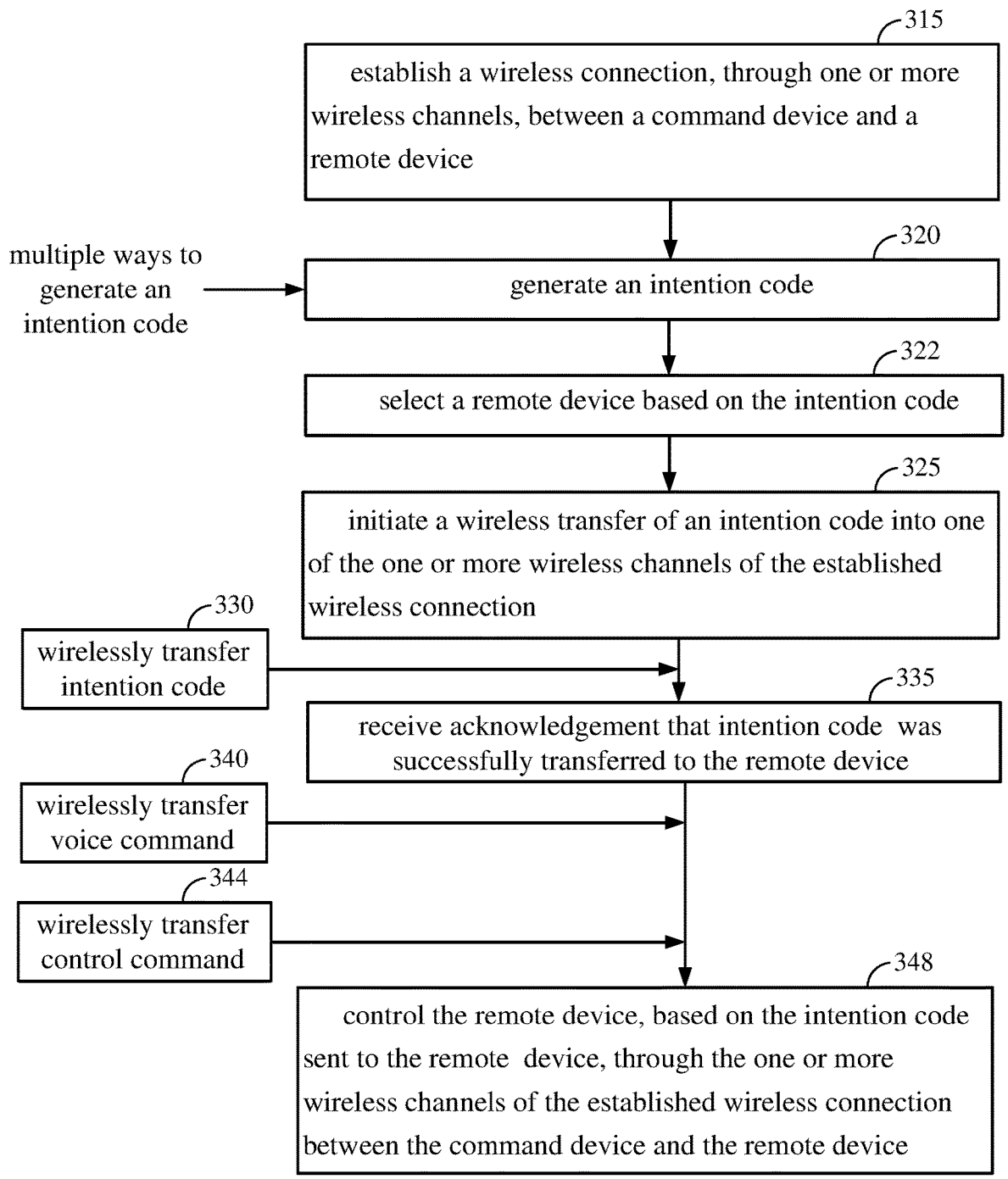
FIG. 3 is a process flow diagram illustrating an embodiment of a command device that initiates a wireless transfer of an intention code over the wireless connection between the command device and the remote device.

FIG. 3 is a process flow diagram illustrating an embodiment of a command device that initiates a wireless transfer of an intention code over the wireless connection 325 between the command device and the remote device selected based on the intention code 322. The wireless connection through one or more wireless channels, between a command device and a remote device 315, may already exist prior to the generation of an intention code. For example, a smart TV or smart speakers may already be wirelessly connected with a command device. Or in another example, the command device within the vehicle 200 in FIG. 2 may already have been in communication with camera 231, through one of the network mechanisms that currently occur in Wi-Fi hotspots, the home or office with mobile devices. That is to say, the mobile device is set to "automatically" wirelessly connect with a remote device, e.g. a router. As such, on a previous occasion, the driver may have already previously wirelessly connected with the remote device 1, or as discussed in FIGS. 1A-1F, the command device 110 may have already wirelessly connected with the remote device 1. It is also possible, that the wireless connection, through one or more wireless channels, between the command device and a remote device 315 is being established for the first time or without a recollection of a previous wireless connection to automatically wirelessly connect the command device and the remote device. It should be understood, that in such a case, it may be possible for the generation of an intention code 320 and/or selection of a remote device based on the intention code 322 to precede (i.e., be determined before) the establishment of the wireless connection between the command device and the remote device 315.

In addition, a processor (e.g. 728 in FIG. 7) within the command device 110 (or an implementation of command device 110 such as command device 700) that initiates a wireless transfer of an intention code into one or more wireless channels of the established wireless connection. Such initiation of the wireless transfer of the intention code may be triggered by the generation of the intention code 320. Thus, it may also be possible to have the selection of the remote device based on the intention code 322 occur after the initiation of the wireless transfer of the intention code. However, it would be appreciated by a person of ordinary skill in the art, that the wirelessly transfer of the intention code 330 may not occur until after there is a selection of the remote device based on the destination code 322.

As explained previously, in a bi-directional communication system (the command device in wireless connection with a remote device), such as the ones described herein, after the intention code is sent from the requester (i.e., the command device), the requester may directly receive acknowledgement (e.g. an ACK signal) that the intention code was successfully transferred to the remote device 1. There may exist a representation mechanism (e.g. a visual signal or audible signal) associated with the that the ACK signal was sent by the remove device 1. The command device, may also indirectly receive acknowledgement that the intention code was successfully transferred to the remote device 1, by the fact that the request is being fulfilled. As such, the receive acknowledgement that intention code was successfully transferred to the remote device 335 may occur (or be perceived to occur) indirectly after a wireless transfer of a voice command 340, or after a wireless transfer of a control command 344, there is control of the remote device 348. Controlling the remote device, based on the intention code sent to the remote device, through one or more wireless channels of the established wireless connection between the command device and the remote device 348 is another way in which it may be shown that the command device received acknowledgement that the intention code was successfully transferred to the remote device 335.

The illustrations and descriptions of FIG. 1A-1F, and FIG. 2 and associated descriptions adhere to the descriptions of the process flow diagram of FIG. 3. In addition, the illustrations and descriptions of FIG. 4, FIG. 5A-5B, FIG. 6, FIG. 7, and associated descriptions adhere to the descriptions of the process flow diagram of FIG. 3.

Figure 4A:
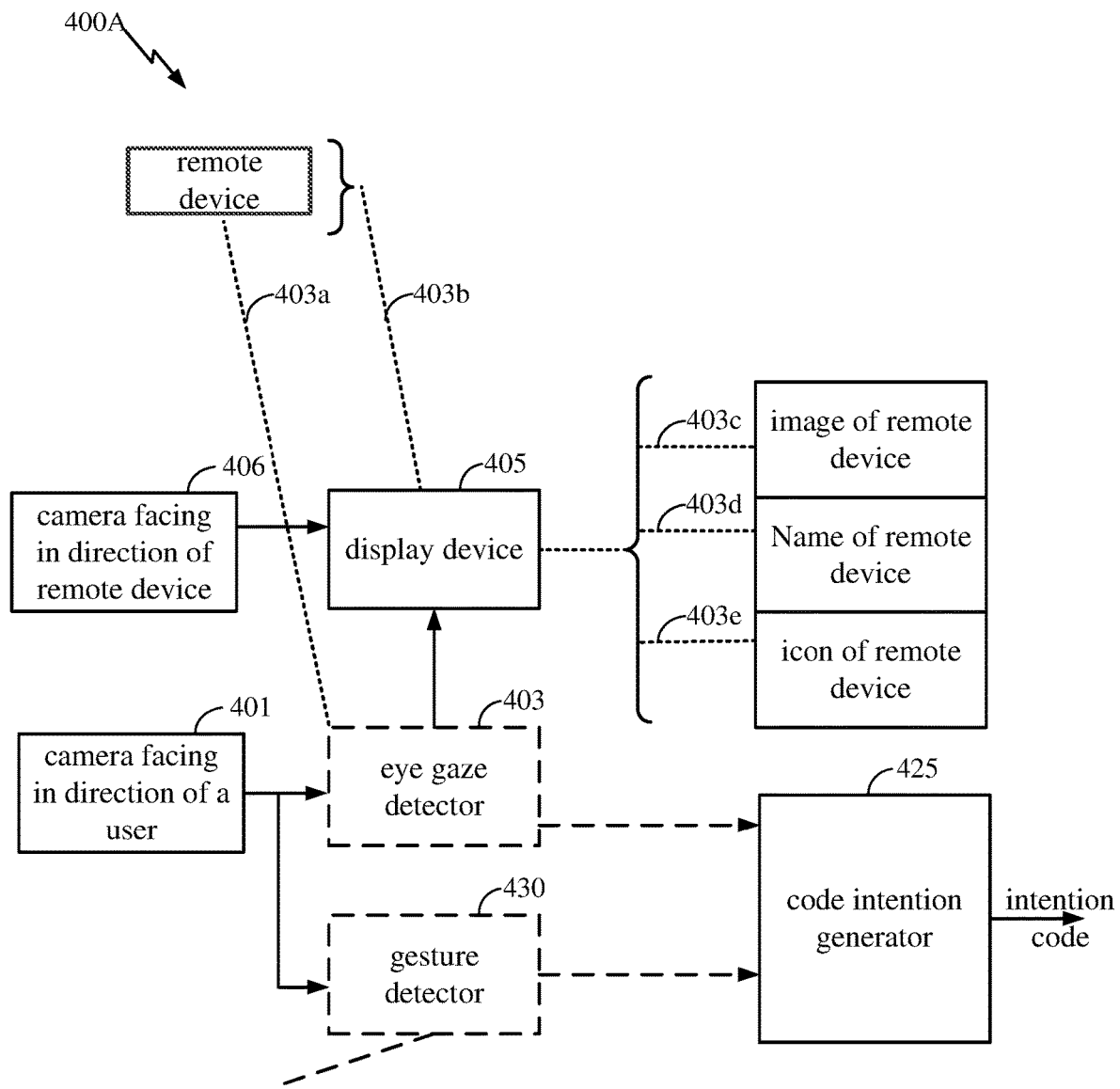
FIG. 4A is an illustration 400A of a number of embodiments of multiple ways to generate an intention code.

FIG. 4A is an illustration of a number of embodiments 400A of multiple ways to generate an intention code. A person having ordinary skill in the art would appreciate that a command device 110 may include a camera facing in the direction of a user 401.

For example, the command device 110 may be a take a similar form to a head mounted display device, or smart glasses, a robot (e.g., indoor robot or outdoor robot), a smart TV, a smart speaker. In addition, there may be one or more cameras facing in the direction of the user 401 coupled to the command device 110. An eye gaze detector 403 and/or a gesture detector 430 may be coupled to the one or more cameras facing in the direction of the user 401. In an embodiment, the eye gaze detector 403 and/or the gesture detector 430 are coupled to the command device 110 and may also be integrated to the command device 110. In addition, in another embodiment, the eye gaze detector 403 and/or a gesture detector 430 may be coupled to a display device 405. In yet another embodiment, the display device 405 may be coupled to the command device 110 and may also be integrated to the command device 110. The display device 405 may include representations of a remote device that is being looked at by a user. For example, the user the eye gaze 403a of the user may be detected by the eye gaze detector 403 when the user is looking directly at the remote device.

Alternatively or additionally, the user may gesture towards the remote device through a pointing gesture (a finger points towards the remote device) or a command gesture (the user makes a sign with fingers or hand) and the gesture detector 430 may interpret that the user is making a gesture towards the remote device directly. The command gesture may be implemented through a command interpreter 764 (see FIG. 7).

Alternatively or additionally, the remote device may be looked at or gestured towards indirectly. That is to say, the remote device may appear 403b on the screen of the display device 405. For example, there may be one or more cameras facing in the direction of the remote device 406, that may be coupled to the display device 405, and are capturing video of the remote device. The user may look at the video of the remote device on the screen of the display device 405 indirectly.

Alternatively or additionally, the display device 405 may include a representation of the remote device through an image of the remote device 403c, or a name of the remote device 403d, or an icon associated with the remote device 403e. As such, the user may see the remote device on the display device 405 indirectly. The representations of the remote device may appear on the display device 405, based on the one or cameras facing in the direction of the remote device 406 or through the command device receiving the location of the remote device. For example, if the remote device is located outside the GPS coordinates of the remote device may be associated with the remote device name, icon, or an image. If the remote device is located inside, a peer to peer technology that includes the location of the remote device may be used to generate the representation of the remote device on the display device 405. For example, the remote device may appear as an image, icon or name, 10 meters away on the upper part of the screen, and a user may understand that to select the remote device the user could look at the image, icon or name on the screen or touch the screen through a gesture.

In FIG. 4A, an intention code generator 425 that is configured to generate an intention code, may be coupled to an eye gaze detector 403 and/or a gesture detector 430. An eye gaze code and/or a gesture code may be determined, respectively, by the eye gaze and/or gesture detected by the eye gaze detector 403, and/or gesture detector 430.

Figure 4B:
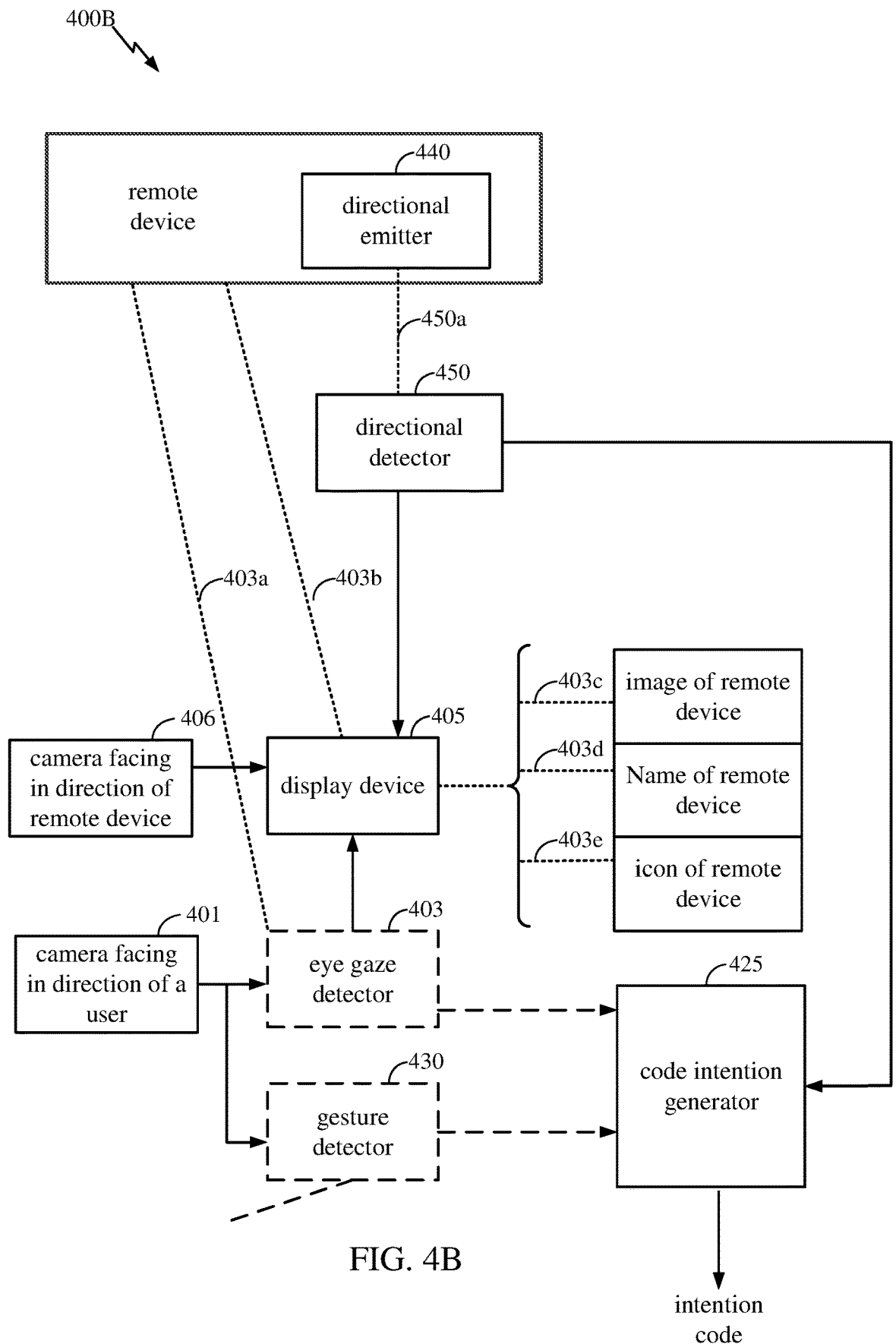
FIG. 4B is an illustration 400B of alternative or additional embodiments to FIG. 4A and other embodiments disclosed herein, where a remote device may transmit directional signals with a directional emitter.

Referring to embodiment 400B in FIG. 4B, alternatively or additionally, to the embodiments disclosed herein, the remote device may itself transmit, for example with a directional emitter 440, a series of directional signals that may be detected by the command device 110. The directional emitter 440 may emit a "ping", e.g. a tone or a pre-fixed code in a watermark within the directional signal, while the remote device is in the line of sight 450a of the command device 110. The directional signals may be ultrasound signals, infrared signals, pulsed radio frequency electromagnetic energy signals, structured light signals, or directional of arrival techniques used in audio signal processing. That is to say, in some embodiments the directional emitter 440 may be an ultrasound emitter, and the corresponding directional detector 450 may be an ultrasound detector 450. In other embodiments, the directional emitter 440 may be an infrared laser, and the corresponding directional detector 450 may be an infrared detector. In yet other embodiments, the directional emitter 440 may be a pulsed radio frequency electromagnetic energy emitter (e.g. similar technology to what may be used in RADAR systems), and the corresponding directional detector 450 may be a radar detector. In yet other embodiments, the remote device may include a structured light emitter as the directional emitter 440, and the command device may include a corresponding structured light detector. In some embodiments, the directional emitter 440 may be loudspeakers of the remote device, and emit sound signals, and the direction of arrival of the emitted sound signals may be detected by a corresponding directional detector 450 including a set of microphones and associated processor coupled to the command device 110. In yet other embodiments, the directional emitter may be one or more transmit antennas of the remote device and emit radio frequency signals, and the directional of arrival of the emitted radio frequency signals may be detected by a corresponding directional detector 450 including a set of receive antennas and associated processor coupled to the command device 110.

The directional signals may aid in determining the location of the remote device relative to the command device 110, as the command device. For example, the command device 110 a directional detector 450 allows the reception of directional signals being emitted by the directional emitter 440 of the remote device. The directional detector 450 may be coupled to a code intention generator 425, and the directional signal may be converted to an intention code. That is to say, when a user of a command device 110 and the remote device are within line of sight 450a, the user may be intentionally pointing the command device 110 to the remote device. If the command device 110 is a wearable, e.g. smart glasses, a VR headset, an AR headset, MR headset, or XR headset, or an audio headset, the eye's and face may be aligned with the orientation of any of these headsets. When the command device 110 and the remote device are in the line of sight 450a aligned, the command device 110 may not include an eye gaze detector, as the directional detector 450 may serve as a proxy for an eye gaze detector. Hence, in some the in the line of sight techniques may obviate the need for relying on eye gaze detection or gesture detection to initiate a transfer of an intention code. In other cases, such in the line of sight techniques may compliment eye gaze detection or gesture detection techniques.

Skilled artisans would appreciate that when the command device 110 and the remote device are aligned through a directional emitter 440 and directional detector 450, because they are in line of sight 450a of each other, there may not be a need to use a wireless connection such as Bluetooth, Wi-Fi, Wi-Fi direct, or some of the various cellular technologies denoted as possible uses for wireless connections. As such, when two devices are within line of sight, a "wireless connection" may also be based on other 'in-line-site' wireless technologies, such as ultrasound, infrared, pulse radio frequency electromagnetic energy, structured light, or directional of arrival techniques used in signal processing (e.g. audio signal processing or radio frequency processing).

Though a "tap" on the display device 405 or on some other part of the command device 110 may be used as a method of selecting the remote device, when two devices are within light of sight 450a of each other, the "tap" signal may not necessarily be transmitted through Bluetooth, Wi-Fi, Wi-Fi direct, or some of the various cellular technologies denoted as possible uses for wireless connections, but may communicated to the remote device through 'in-line-of-site' wireless technologies, in the form of a special ping or pre-fixed code transmitted by the command device 110. Such transmission and reception of a "tap", may be possible if for example, the command device 110 also included a directional emitter (not shown) and the remote device also included a directional detector (not shown).

Figure 5A:
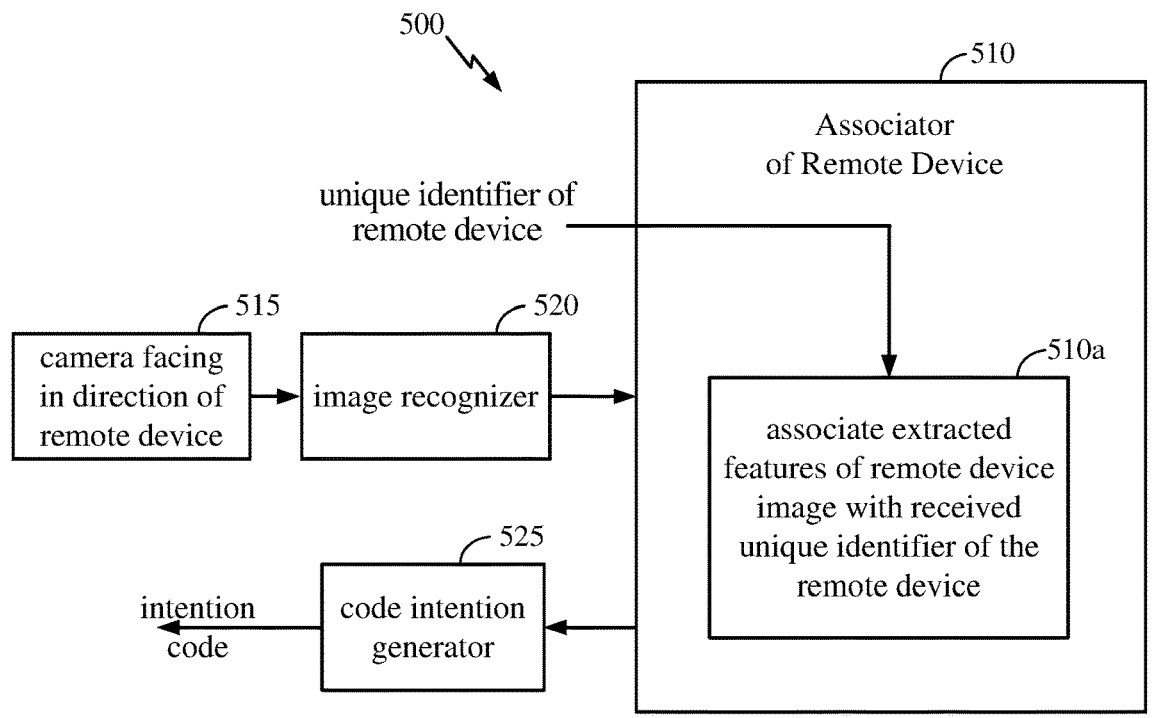
FIG. 5A is an illustration of one embodiment of an associator of a remote device using extracted features of the remote device image with a unique identifier of the remote device to generate an intention code.
Figure 5B:
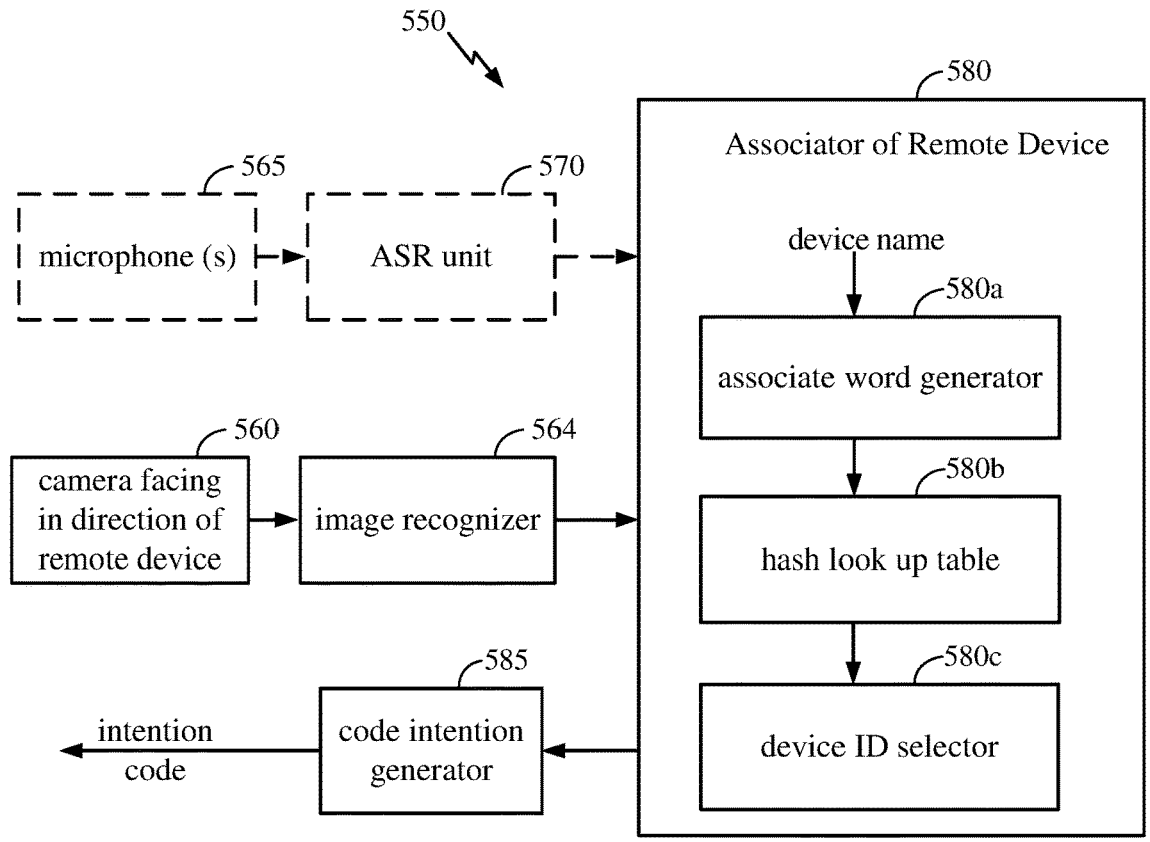
FIG. 5B is an illustration of one embodiment 500 of an associator of a remote device using extracted features of the remote device image with a device name the remote device to generate an intention code.

FIG. 5A is an illustration of one embodiment 500 of an associator of a remote device using extracted features of the remote device image with a unique identifier of the remote device to generate an intention code. FIG. 5B is an illustration of one embodiment 550 of an associator of a remote device using extracted features of the remote device image with a device name the remote device to generate an intention code In the embodiments 500 of FIG. 5A and 550 of FIG. 5B, neither an eye gaze detector 403 and/or gesture detector 430 may necessarily be included in the command device 110. In the embodiments 500 and 5550 of FIG. 5A and FIG. 5B, one or more cameras facing in the direction of the device 515 may be coupled to an image recognizer 520. The image recognizer 520 may be integrated to the command device 110. Each of the one or more cameras facing in the direction of the device 515 may include its own version of an image recognizer 520. The one or more cameras coupled to the command device 110 facing the remote device, may perform feature extraction techniques, and may be able to match image features from the remote device 1 and match them with a local database associated with the command device 110. Examples of feature extraction techniques include, but are not limited to, Scale Invariant Feature Transform (SIFT), Histogram of Gradients (HOG), color segmentation to classify objects, region of interest (ROI) based on pixel comparisons.

In the embodiment 500 of FIG. 5A, the command device 110 of any of FIGS. 1A-1F, and FIG. 2 may receive, a unique identifier of the remote device (e.g. a MAC address of the remote device), and associate extracted features of the remote device image with received unique identifier of the remote device. Based on the association, an intention code generator 525 may be configured to generate an intention code. The remote device may be selected by a user, and the command device 110 may initiate a wireless transfer of the intention code to the remote device.

In the embodiment 550 of FIG. 5B, the command device 110 of any of FIGS. 1A-1F, and FIG. 2 may receive, a device name of the remote device. For example, the device name may be generated by the user uttering the device name of the remote device and the utterance being captured by one or more microphones 565. The utterance may then be converted to a device name by an ASR unit 570, coupled to the one or more microphones 565. Alternatively, the device name may be input by text or may be visible from a menu on the display device 405. Whether spoken, input by text, or touched or pointed to on a visible menu through a gesture, the device name may be associated with a word generator 580a with an image, icon or name. The word generator 580a may enrich the words from the device ID name that exist with remote device, e.g. from "Samsung smart TV" to TV, television, screen, LCD, curved. The device name, image, or icon may be passed through a hash look up table 580b, and a hash tag may be generated. The has tag may be associated with image feature extraction, and when part of the features are matched to the associated image of the device, the appropriate ID may be selected, through a device ID selector 580c.

Alternatively or additionally, the matched image may lead to a particular keyword or phrase that is associated with the remote device ID selector 580c being generated and used as a voice command or control command. For example, the image of a bright lamp, may be used to generate a word through a voice command or control command to turn on a lamp. The image of a dim lamp, may be used to generate a word through a voice command or control command to turn off or dim a lamp. Similarly, a series of images of a thermostat and an up arrow may be used to generate a word through a voice command or control command to turn up the temperature in a room. This may be possible as the device ID may be associated with the corresponding hash tag generated by the hash look up table 580b. In may be possible to send the voice command directly to the remote device's ASR local unit, i.e., a remote device may have its own ASR unit. In a different embodiment, the ASR unit may be bypassed and the control command may be processed without the aid of the ASR unit, directly as a result of the hash tag.

Figure 6:
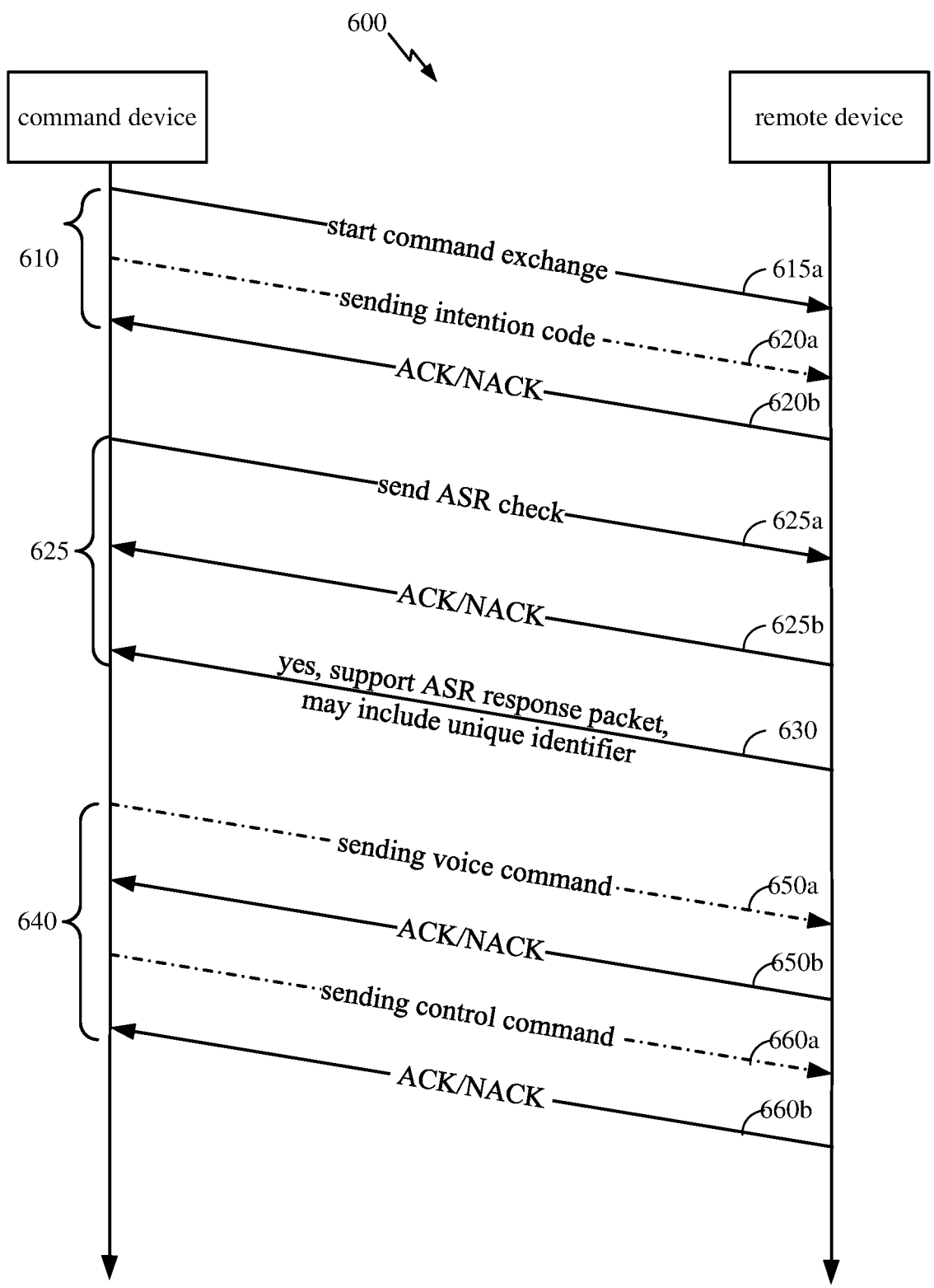
FIG. 6 is an illustration of several embodiments of a message exchange flow between a command device and a remote device.

FIG. 6 is an illustration 600 of several embodiments {610, 625, and 640} of a message exchange flow between a command device and a remote device. The message exchange flow may be implemented within the transport layer (i.e., layer 4) of the command device. The transport layer may be implemented within a network interface unit 770 (see FIG. 7). In some embodiments, the network interface 770 may not be part of the processor 728 itself but may still be coupled to the processor 728. The message exchange flow may interpret or convert the eye gaze codes, gesture codes, control commands, and/or voice commands from a previous layer into one or more messages, to use a message-based protocol between the command device 110 and the remote device.

As illustrated in FIG. 6, in a first embodiment 610, the command device may start a command exchange message 615a through a message-based protocol with a remote device that is implemented within a transport layer of the command device. The start command exchange is an example of an initial message to be sent, but there may be a different command message that is sent initially known by a different name. The start a command exchange message 615a may be a result of the initiation of a wireless transfer on an intention code 315 by a processor 728 within a command device 110. A sending intention code message 620a may then be sent from the command device to the remote device. In addition, a transceiver 722 and antenna 712 (e.g. see FIG. 7) or a transceiver and one or more antennas 256 (as in FIG. 2) may wirelessly transmit the intention code as part of the payload of the wireless connection, so that a wireless transfer of the intention code 330, as disclosed in the description of FIG. 3, may be completed. The remote device may send a message acknowledging (may be referred to as an "ACK" message) that the remote device received the intention code message 620b and/or the intention code. As such, the command device may receive acknowledgement that the intention code was successfully transferred to the remote device 335, as disclosed in the description of FIG. 3. If the intention code message and/or the intention code is not successfully delivered to the remote device, the remote device may send back a "NACK" message, i.e., not acknowledged.

As illustrated in FIG. 6, in a second embodiment 625, the command device may send an automatic speech recognition (ASR) check message 625a through a message-based protocol to the remote device as a check to see if the remote device supports processing voice commands, after it receives an intention code. If the ASR check message 625a is not successfully delivered to the remote device, the remote device may send back a "NACK" message 625b, i.e., not acknowledged. Otherwise, if there is successfully delivery of the ASR check message 625a by the command device, the remote device may send back a message acknowledging that the remote device received the ASR check message 625b. Alternatively or additionally, the command device, may receive a "Yes, support ASR response packet", which may include a unique identifier (e.g. a MAC address) of the remote device 630. The unique identifier may be used in other embodiments as described herein.

In an embodiment, a display device 405 may present a result of the check if the remote device supports processing voice commands using automatic speech recognition technology. That is to say, a processor 728 may be coupled to the display device 405 and illustrate the result for the user that the remote device may receive a voice command. The result may be a visual or audible notification. For example, the visual notification may be an ASR with a check next to it, or displayed text indicating "Yes, support ASR". An example of an audible notification could also be "Yes, support ASR".

As illustrated in FIG. 6, in a third embodiment 640, the command device may send a voice command message 650a to the remote device as a result of detection of a voice command by an ASR unit 752. The ASR unit 752 may be coupled to a command device 110, and may also be integrated as part of the command device 110. As described in other examples, after a user's intent is detected, the user may utter a phrase intended to command the remote device by a voice command, and the voice command is detected by an ASR unit 752 (e.g. in component or unit within the processor 728). Consequently, the command device may send a voice command message 650a to the remote device. The remote device may send a message acknowledging (may be referred to as an "ACK" message) that the remote device received the voice command message 650a and/or the voice command. As such, the command device may receive acknowledgement that the voice command was successfully wirelessly transferred 340, as disclosed in the description of FIG. 3. If the voice command message 650a and/or the voice command is not successfully delivered to the remote device, the remote device may send back a "NACK" message, i.e., not acknowledged.

Alternatively or additionally, the command device may send a control command message 660a to the remote device as a result of detection of a gesture by gesture detector 744 (or 430). The gesture detector 740 or (430) may be coupled to a command device, and may also be integrated as part of the command device. As described in other examples, after a user's intent is detected, the user may present a gesture by pointing or touching part of the display device and intending to control the remote device by the gesture. The gesture may be detected by the gesture detector 744 (or 430) (e.g. in the processor 728) and converted (as shown by the input arrow labeled from gesture detector input to the command interpreter 764 in FIG. 7) to a control command within a command interpreter 764 (see FIG. 7). In some embodiments, a voice command may also be converted (764 (as shown by the input arrow labeled from ASR unit input to the command interpreter 764 in FIG. 7) to a control command within the command interpreter 764. Consequently, the command device may send a control command message 660a to the remote device. The remote device may send a message acknowledging (may be referred to as an "ACK" message) that the remote device received the control command message 660a and/or the control command. As such, the command device may receive acknowledgement that the control command was successfully wirelessly transferred 344, as disclosed in the description of FIG. 3. If the control command message 660a and/or the control command is not successfully delivered to the remote device, the remote device may send back a "NACK" message, i.e., not acknowledged.

Within this disclosure, various embodiments and examples disclosed herein provide a number of advantages and benefits, and create opportunities not previously foreseen by others. Firstly, when there are multiple common ASR platform devices within close proximity of each other in a shared acoustic space, there may be a coordinated response such that the ASR platform devices do not respond out of sync. Secondly, by sending an intention code through a wireless channel, multiple common ASR platform devices may be able to communicate when they do not share the same acoustic space. Third, the coordination of user intention technologies with ASR technologies with ASR human interface device(s) ("HID(s)") allow for the user to control a HID not in the same acoustic space through an intention code.

Referring to FIG. 7 is a component block diagram illustrating an example of a command device 700 suitable for implementing various embodiments. In various implementations, the device 700 may have more components or fewer components than illustrated in FIG. 7.

In a particular implementation, the command device 700 includes a processor 728 which includes: a central processing unit (CPU); or a digital processor (DSP); or a general purpose unit (GPU), coupled to the memory 726. The memory 726 includes instructions 730 (e.g. executable instructions) such as computer-readable instructions or processor-readable instructions. The instructions 730 may include one or more instructions that are executable by a computer, such as the processor 728.

FIG. 7 also illustrates one or more controllers 720 that are coupled to the processor 728 and to a number of components in the command device 700. For example, the one or more controllers 720 may be coupled to various peripheral devices (e.g. the display device 710, sensor(s) 708, camera(s) 706, and microphone(s) 702). The display device 710 may serve the purpose of the display device 405. However, a as described herein the display device 405 may not be integrated with the command device 700 or in implementations associated with the descriptions with command device 110 disclosed herein.

An audio coder/decoder (CODEC) (not drawn) may also be coupled to the processor 728 and memory 726. The microphone(s) 702 may be coupled to the audio CODEC. The audio CODEC output may be an audio buffer 736 and may store samples of audio captured by the microphone(s) 702. The samples of audio captured by the microphone(s) 702 may include a voice command. A video coder/decoder (CODEC) (not drawn) may also be coupled to the processor 728 and memory 726. The camera(s) 706 may be coupled to the video CODEC. The video CODEC output may be a pixel buffer 734 and may store pixels of video captured by the camera(s) 706. The pixels of video captured by the camera(s) 706 may include an image or a portion of an image of a remote device, or an image or portion of an image of a user. The sensor(s) 708 may be coupled to the processor 728 and memory 726. The output of the sensor(s) may be a sensor buffer 732 and may store samples of location data described herein captured by the sensor(s) 708.

The command device 700 may include transceiver 722, and the transceiver 722 may be coupled to the processor 728 and to an antenna 712, such that wireless data (e.g. the intention codes, or voice commands or control commands) received via the antenna 712 and the transceiver 722 may be provided to the processor 728. In some implementations, the processor 728, the controller(s) 720, the memory 726, and the transceiver 722 may be included in a system-in-package or system-on-chip device. In some implementations, the various peripherals may be integrated into the command device 700.

Moreover, in a particular implementation, as illustrated in FIG. 7, the display device 710, sensor(s) 708, camera(s) 706, and microphone(s) 702) the antenna 712, are external to the system-on-chip device. In a particular implementation, each of the display device 710, sensor(s) 708, camera(s) 706, microphone(s) 702) and the antenna 712 may be coupled to a component of the system-on-chip device, such as one or more controller(s) 720 or the memory 726.

In a particular implementation, illustrated in FIG. 7, the eye gaze tracker 740, a gesture detector 744, and image recognizer 748, coupled to an associator of remote device 750, may all be coupled to an intention code generator 742, and implemented in the processor 728. The output of intention code generator 742 may be an intention code, and may additionally be an icon, image, name, or other unique identifier (e.g. a MAC address) associated with a remote device, and provided to a remote device selector 743. In other implementations (as previously disclosed herein), neither the eye gaze detector 740 nor the gesture detector 744 may be present in the command device 700. For example, the image recognizer 748 and one of the embodiments associated with the associator of remote device 750 may be used to capture the intention of the user. In a different example, the image recognizer and the associator of remote device 750 may not be present in the command device 700, and a directional detector (not shown) may be coupled to the intention code generator 742. In addition, the remote device selector 743, may be included as part of a network interface unit, or the unique identifier or address of the remote device. The unique identifier may be stored based on the wireless connection, and the intention code generator 748 may not need to expressly provide the unique identifier a remote device selector 743, or need to necessarily provide the unique identifier to a network interface unit 770.

In a particular implementation illustrated in FIG. 7, the command interpreter 764, may receive input from either a gesture detector 744 or an ASR unit 752, or both the gesture detector 744 and the ASR unit 752, and interpret a gesture or a voice command as a command. The command interpreter 764, may be coupled to the network interface unit 770. In the particular implementation illustrated in FIG. 7, the network interface unit 770 may be integrated as part of the processor 728. In other implementations, the network interface unit 770 may be outside the processor 728. In other implementations, the command interpreter may be outside of the processor 728.

A skilled artisan would appreciate that the display device 220 may be implemented in one or more of the embodiments described herein with respect to display device 405 or display device 710.

The device 700 may include a headset, smart glasses, or future versions augmented reality devices, virtual reality devices, mixed reality devices, extended reality devices, a robot, mobile communication device, a smart phone, a cellular phone, a laptop computer, a computer, a tablet, a personal digital assistant, a display device, a television, a gaming console, a music player, a radio, a digital video player, a digital video disc (DVD) player, a camera, a navigation device, a vehicle, a component of a vehicle, or any combination thereof, as illustrative, non-limiting examples.

In an illustrative implementation, the memory 726 may include or correspond to a non-transitory computer readable medium storing the instructions 730. The instructions 730 may include one or more instructions that are executable by a computer, such as the processors 770. The instructions 730 may cause the processor 770 to perform one or more operations described herein, including but not limited to one or more portions of the descriptions associated with any of the FIG. 1A-1F, 2, 3, 4, 5, 6 or 7.

In a particular implementation, one or more components of the systems and devices disclosed herein may be integrated into a decoding system or apparatus (e.g., an electronic device, or a processor therein), into an encoding system or apparatus, or both. In other implementations, one or more components of the systems and devices disclosed herein may be integrated into a wireless telephone, smart glasses, or future versions of augmented reality devices, virtual reality devices, mixed reality devices, extended reality devices, a robot, a tablet computer, a desktop computer, a laptop computer, a set top box, a music player, a video player, an entertainment unit, a television, a game console, a navigation device, a communication device, a personal digital assistant (PDA), a fixed location data unit, a personal media player, or another type of device.

In conjunction with the described techniques, a first command device includes means for establishing a wireless connection, through one or more wireless channels, between the command device and a remote device, means for generating an intention code, means for selecting a remote device based on the intention code, means for initiating a wireless transfer, through one or more wireless channels of the established wireless connection, of an intention code, means for receiving acknowledgement that the intention code was successfully transferred to the remote device, means for controlling the remote device, based on the intention code sent to the remote device, through the one or more wireless channels of the established wireless connection between the command device and the remote device. For example, the means for establishing, the means for initiating a wireless transfer of an intention code, and the means for controlling the remote device based on the intention code may include the processor 728 of FIG. 7, and the instructions 730 executable by a processor, one or more other devices, circuits, modules, or any combination thereof.

A base station may be part of a wireless communication system and may be operable to perform the techniques described herein. The wireless communication system may include multiple base stations and multiple wireless devices. The wireless communication system may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1×, Evolution-Data Optimized (EVDO), Time Division Synchronous CDMA (TD-SCDMA), or some other version of CDMA.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the disclosure herein may be implemented directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. Combinations of the above should also be included within the scope of non-transitory computer-readable media. Additionally, the operations of a method or algorithm may reside as one or any combination or set of codes and/or instructions on a non-transitory processor-readable medium and/or non-transitory computer-readable medium, which may be incorporated into a computer program product. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A command device, located in a vehicle, comprising:
  one or more processors configured to:
    select a remote camera located outside of the vehicle, wherein the remote camera is not mounted on the vehicle and is within view of a passenger in the vehicle, based on an intention code, wherein the intention code is one or more bits that represents an intention of a user of the command device and is associated with an eye gaze of the user, and wherein the command device and the remote camera are not in a shared acoustic space, wherein the intention code provides an indication that a passenger in the vehicle associated with the command device is intending to engage in a communication with the remote camera wirelessly connected with the command device;
    receive a first acknowledgement that the intention code was successfully wirelessly transferred through one or more wireless channels of an established wireless connection between the command device and the remote camera, prior to a wireless transfer of bits that represent a voice command to the remote camera, wherein the first acknowledgement is a first ACK signal that is part of a message-based protocol with the remote device that is implemented within a transport layer of the command device;

receive the voice command, detected by one or more microphones coupled to the command device, from the passenger in the vehicle; and receive a second acknowledgement, wherein the second acknowledgement is a second ACK signal that is part of the message-based protocol with the remote device that is implemented within the transport layer of the command device, through the one or more wireless channels of the established wireless connection, after the wireless transfer of the bits that represent the voice command to the remote camera.

2. The command device of claim 1, further comprising a camera coupled to the vehicle, and wherein the camera is, coupled to the one or more processors, including an eye gaze detector that is configured to detect eye gaze associated with selection of the remote camera.

3. The command device of claim 2, wherein the camera coupled to the vehicle is located in the vehicle and is configured to receive a view which includes a visual representation of the remote camera, and the intention code is associated with the remote camera.

4. The command device of claim 3, wherein the camera located in the vehicle is configured to receive the view which includes the visual representation of the remote camera, wherein the visual representation includes an occlusion of the remote camera, and the intention code is associated with the remote camera.

5. The command device of claim 1, further comprising one or more microphones, coupled to the one or more processors, configured to capture the voice command associated with the request to control the remote camera, and further comprising a memory, coupled to the one or more processors, including an audio buffer configured to store the voice command.

6. The command device of claim 5, wherein the one or more processors further comprise an automatic speech recognition unit configured to process the voice command.

7. The command device of claim 1, wherein the one or more processors are further configured to check if the remote camera supports processing voice commands using automatic speech recognition technology.

8. The command device of claim 7, further comprising a display device located in the vehicle, coupled to the one or more processors, configured to represent one or more devices, including the remote camera, wirelessly connected to the command device, and present on the display device a result of the check if the remote camera supports processing voice commands using automatic speech recognition technology.

9. The command device of claim 8, wherein the command device is coupled to the vehicle.

10. The command device of claim 1, wherein the processor is further configured to output one or more control commands based on the intention code to wirelessly transfer.

11. The command device of claim 1, wherein the wireless connection comprises one of a Bluetooth technology, Wi-Fi, technology, Wi-Fi direct technology, a cellular wireless technology, or a combination of a Bluetooth technology, Wi-Fi technology, Wi-Fi direct technology, or cellular technology.

12. The command device of claim 1, further comprising a display device located in the vehicle, coupled to the one or more processors, configured to represent on the display device at least one remote camera name, at least one remote camera icon, or at least one remote camera image, and wherein the one or more processors are configured to select the remote camera, to wirelessly transfer the intention code, based on associating the intention code with the at least one remote camera name, the at least one remote camera icon, or the at least one remote camera image.

13. The command device of claim 1, wherein the one or more processors are configured to select the remote camera, to wirelessly transfer the intention code, based on associating the intention code with extracted image features of the remote camera.

14. The command device of claim 13, further comprising a camera coupled to the vehicle, and coupled to the one or more processors, configured to capture an image of the remote camera, wherein the image is used to extract the image features of the remote camera.

15. The command device of claim 1, wherein the intention code is either an eye gaze code or a gesture code.

16. The command device of claim 1, further comprising a transceiver coupled to the command device, configured to transmit the intention code and, the voice command or one or more control commands, or both the voice command and the one or more control commands.

17. The command device of claim 1, wherein request to control the remote camera is a request for the remote camera to send a video stream to the command device.

18. The command device of claim 17, further comprising a display device coupled to the command device, and the display device is configured to display the video stream.

19. The command device of claim 17, wherein the request for the remote camera to send a video stream is also based on one or more control commands being sent to the remote camera.

20. The command device of claim 1, further comprising a display device coupled to the command device, wherein the display device includes a gesture detector and is configured to receive a touch input associated with selection of the remote camera.

21. The command device of claim 1, further comprising a camera coupled to the vehicle wherein the camera includes a gesture detector and is configured to receive a non-touch gesture input associated with selection of the remote camera.

22. The command device of claim 1, wherein request to control the remote camera is a request for the remote camera to move is also based on one or more control commands being sent to the remote camera.

23. The command device of claim 1, wherein the one or more processors are configured to receive a unique identifier of the remote camera and associate extracted features of an image of the remote camera with the received unique identifier of the remote camera, and based on the association, generate the intention code, select the remote camera.

24. The command device of claim 1, wherein the one or more processors are configured to receive a unique identifier of the remote camera, wherein the unique identifier is a MAC address of the remote camera.

25. The command device of claim 1, wherein the one or more processors are configured to receive a different acknowledgment than the first acknowledgement and the second acknowledgment that the remote camera supports processing voice commands using automatic speech recognition technology.

26. A method comprising:

selecting a remote camera located outside of a vehicle, wherein the remote camera is not mounted on the vehicle and is within view of a passenger in the vehicle based on intention code, wherein the intention code is one or more bits that represents an intention of a user of the command device and is associated with an eye gaze of the user, and wherein the command device and the remote camera are not in a shared acoustic space, wherein the intention code provides an indication that the passenger in the vehicle associated with the command device is intending to engage in a communication with the remote camera wirelessly connected with the command device;

receiving a first acknowledgement that the intention code was successfully wirelessly transferred through one or more wireless channels of an established wireless connection between the command device and the remote camera, prior to a wireless transfer of bits that represent a voice command to the remote camera, wherein the first acknowledgement is a first ACK signal that is part of a message-based protocol with the remote device that is implemented within a transport layer of the command device;

receiving the voice command, detected by one or more microphones coupled to the command device, from the passenger in the vehicle; and receiving a second acknowledgement, wherein the second acknowledgement is a second ACK signal that is part of a message-based protocol with the remote device that is implemented within the transport layer of the command device, through the one or more wireless channels of the established wireless connection, after the wireless transfer of the bits that represent the voice command to the remote camera.

27. The method of claim 26, further comprising receiving a unique identifier of the remote camera and associating extracted features of an image of the remote camera with the received unique identifier of the remote camera, and based on the association, generating the intention code, selecting the remote camera, and transmitting the intention code to the selected remote camera.

28. The method of claim 26, further comprising generating the intention code from a camera coupled to the vehicle.

29. The method of claim 28, prior to the wireless transfer of the intention code to the remote camera, further comprising receiving an image of the remote camera, by a transceiver coupled to the vehicle, from the camera, and extracting the image features of the remote, associating the intention code with extracted image features of the remote camera, and selecting the remote camera.

30. The method of claim 26, further comprising transmitting, by a transceiver coupled to the command device, the intention code and, the voice command or one or more control commands, or both the voice command and the one or more control commands, wherein the request to control the remote camera includes a request to the remote camera to send a video stream, and receiving the video stream, by a transceiver coupled to the command device, over the one or more wireless channels, and displaying the video stream to the display device coupled to the command device.

31. The method of claim 26, prior to the wireless transfer of the intention code, further comprising representing on a display device at least one remote camera name, at least one remote icon, or at least one remote camera image, and associating the intention code with the at least one remote camera name, the at least one remote camera icon, or the at least one remote camera image, and selecting the remote camera.

32. An apparatus comprising:
means for selecting a remote camera located outside of a vehicle, wherein the remote camera is not mounted on the vehicle and is within view of a passenger in the vehicle based on intention code, wherein the intention code is one or more bits that represents an intention of a user of the command device and is associated with an eye gaze of the user, and wherein the command device and the remote camera are not in a shared acoustic space, wherein the intention code provides an indication that the passenger in the vehicle associated with the command device is intending to engage in a communication with the remote camera wirelessly connected with the command device;

means for receiving a first acknowledgement that the intention code was successfully wirelessly transferred through one or more wireless channels of an established wireless connection between the command device and the remote camera, prior to a wireless transfer of bits that represent a voice command to the remote camera, wherein the first acknowledgement is a first ACK signal that is part of a message-based protocol with the remote device that is implemented within a transport layer of the command device;

means for receiving the voice command, detected by one or more microphones coupled to the command device, from the passenger in the vehicle; and means for receiving a second acknowledgement, wherein the second acknowledgement is a second ACK signal that is part of a message-based protocol with the remote device that is implemented within the transport layer of the command device, through the one or more wireless channels of the established wireless connection, after the wireless transfer of the bits that represent the voice command to the remote camera.

33. A non-transitory computer-readable storage medium having stored thereon instructions that, when executed, cause one or more processors of a command device to:
select a remote camera located outside of the vehicle, wherein the remote camera is not mounted on the vehicle and is within view of a passenger in the vehicle, based on an intention code, wherein the intention code is one or more bits that represents an intention of a user of the command device and is associated with an eye gaze of the user, and wherein the command device and the remote camera are not in a shared acoustic space, wherein the intention code provides an indication that a passenger in the vehicle associated with the command device is intending to engage in a communication with the remote camera wirelessly connected with the command device;

receive a first acknowledgement that the intention code was successfully wirelessly transferred through one or more wireless channels of an established wireless connection between the command device and the remote camera, prior to a wireless transfer of bits that represent a voice command to the remote camera, wherein the first acknowledgement is a first ACK signal that is part of a message-based protocol with the remote device that is implemented within a transport layer of the command device;

receive the voice command, detected by one or more microphones coupled to the command device, from the passenger in the vehicle; and receive a second acknowledgement, wherein the second acknowledgement is a second ACK signal that is part of the message-based protocol with the remote device that is implemented within the transport layer of the command device, through the one or more wireless channels of the established wireless connection, after the wireless transfer of the bits that represent the voice command to the remote camera.

* * * * *